United States Patent [19]
Greene et al.

[11] Patent Number: 5,579,455
[45] Date of Patent: Nov. 26, 1996

[54] RENDERING OF 3D SCENES ON A DISPLAY USING HIERARCHICAL Z-BUFFER VISIBILITY

[75] Inventors: Edward C. Greene; Michael H. Kass; Gavin S. P. Miller, all of Palo Alto, Calif.

[73] Assignee: Apple Computer, Inc., Cupertino, Calif.

[21] Appl. No.: 100,113

[22] Filed: Jul. 30, 1993

[51] Int. Cl.$^6$ ........................................ G06T 15/00
[52] U.S. Cl. ........................ 395/122; 395/119; 395/121
[58] Field of Search .................... 395/119, 120, 395/121, 122, 123, 128–132, 133, 134, 135, 136, 141, 152–154, 155, 160, 161, 162–166; 382/240, 266, 302–304

[56] References Cited

U.S. PATENT DOCUMENTS

| | | | |
|---|---|---|---|
| 4,918,626 | 4/1990 | Watkins et al. | 364/522 |
| 4,928,250 | 5/1990 | Greenberg et al. | 364/518 |
| 4,987,554 | 1/1991 | Kaufman | 364/522 |
| 5,031,117 | 7/1991 | Minor et al. | 364/521 |
| 5,038,302 | 8/1991 | Kaufman | 364/522 |
| 5,043,922 | 8/1991 | Matsumoto | 364/522 |
| 5,138,699 | 8/1992 | Minor et al. | 364/518 |
| 5,228,098 | 7/1993 | Crinon et al. | 382/240 |
| 5,282,255 | 1/1994 | Bovik et al. | 382/266 |

OTHER PUBLICATIONS

Measher, "Efficient Synthetic Image Generation of Arbitrary 3-D Objects" 1982.

S. M. Rubin and T. Whitted, "A 3-dimensional representation for fast rendering of complex scenes," Computer Graphics, vol. 14, No. 3, pp. 110–116, Jul. 1980.

A. Glassner, "Space subdivision for fast ray tracing," *IEEE CG&A*, vol. 4, No. 10, pp. 15–22, Oct. 1984.

D. Jevans and B. Wyvill, "Adaptive voxel subdivision for ray tracing," *Proc. Graphics Interface* '89, pp. 164–172, Jun. 1989.

T. Kay and J. Kajiya, "Ray tracing complex scenes," *Computer Graphics*, vol. 20, No. 4, pp. 269–278, Aug. 1986.

Michael Kaplan, "The use of spatial coherence in ray tracing," in Techniques for computer graphics, etc. D. Rogers and R. A. Earnshaw, Springer–Verlag, New York, 1987.

H. Hubschman and S. W. Zucker, "Frame to frame coherence and the hidden surface computation: constraints for a convex world," *ACM TOG*, vol. 1, No. 2, pp. 129–162, Apr., 1982.

David Jevans, "Object space temporal coherence for ray tracing," *Proc. Graphics Interface*, '92, Vancouver, B. C., pp. 176–183, May 11–15, 1992.

A. Glassner, "Spacetime ray tracing for animation," *IEEE CG&A*, vol. 4, No. 10, pp. 15–22, Oct. 1984.

J. Chapman, T. W. Calvert, and J. Dill, "Exploiting temporal coherence in ray tracing," *Proceedings of Graphics Interface* '90, pp. 196–204, 1990.

Sig Badt, Jr., "Two algorithms for taking advantage of temporal coherence in ray tracing," *The Visual Computer*, No. 4, pp. 123–132, 1988.

B. Garlick, D. Baum and J. Winget, "Interactive viewing of large geometric databases using multiprocessor graphics workstations," *Siggraph '90 Course Notes* (Parallel Algorithms and Architectures for 3D Image Generation), 1990.

(List continued on next page.)

*Primary Examiner*—Almis R. Jankus
*Attorney, Agent, or Firm*—Fliesler, Dubb, Meyer & Lovejoy

[57] ABSTRACT

A hierarchical Z-buffer scan-conversion algorithm that does well on both (a) quickly rejecting most of the hidden geometry in a model, and (b) exploiting the spatial and temporal coherence of the images being generated. The method uses two hierarchical data structures, an object-space octree and an image-space Z-pyramid, in order to accelerate scan conversion. The two hierarchical data structures make it possible to reject hidden geometry very rapidly while rendering visible geometry with the speed of scan conversion. For animation purposes, the algorithm is also able to exploit temporal coherence. The resulting method is well suited to models with high depth complexity, achieving significant speedup in some cases compared to ordinary scan conversion.

37 Claims, 18 Drawing Sheets

OTHER PUBLICATIONS

John Airey, "Increasing Update Rates in the Building Walkthrough System with Automatic Model–Space Subdivision and Potentially Visible Set Calculations," Technical Report TR90–027, The University of North Carolina at Chapel Hill, Department of Computer Science, 1990.

John Airey, John Rohlf, and F. Brooks. "Towards image realism with interactive update rates in complex virtual building environments," *ACM SIGGRAPH Special Issue on 1990 Symposium on Interactive 3D Graphics,* 24 (2) pp. 41–50, 1990.

S. Teller and C. Sequin, "Visibility Preprocessing for Interactive Walkthroughs," *Computer Graphics '91 (Proc. SIGGRAPH '91),* 25 (4) pp. 61–69, 1991.

S. Teller and C. Sequin, "Visibility computations in polyhedral three–dimensional environments," U.C. Berkeley Report No. UCB/CSD 92/680, Apr. 1992.

Donald Meagher, "Efficient synthetic image generation of arbitrary 3–D objects," *Proc. IEEE Conf. on Pattern Recognition and Image Processing,* pp. 473–478, Jun. 1982.

Foley and Van Dam, "Fundamentals of Interactive Computer Graphics" (1984), Chap. 15, pp. 553–573.

RENDERING OF 3D SCENES ON A DISPLAY USING HIERARCHICAL Z-BUFFER VISIBILITY

BACKGROUND

Extremely complex geometric databases offer a variety of interesting challenges for visibility algorithms. Consider the problem, for example, of enabling an interactive walk-through of a detailed geometric database describing an entire city, complete with trees and flowers, buildings, the furniture inside the buildings and the contents of the furniture. Traditional visibility algorithms running on currently available hardware cannot come close to dealing with this complexity and it will be a long time before faster hardware alone will suffice. In order to get the most out of the available hardware, it would be advantageous to exploit properties of the visibility computation itself to develop faster algorithms.

There are at least three types of coherence inherent in the visibility computation which can be exploited to accelerate a visibility algorithm. The first is object-space coherence: in many cases a single computation can resolve the visibility of a collection of objects which are near each other in space. The second is image-space coherence: in many cases a single computation can resolve the visibility of a collection of pixels simultaneously. The third is temporal coherence: knowing the visibility of a collection of objects in one frame can often be used to accelerate visibility computation for the objects in the next frame.

There have been many attempts to accelerate traditional ray-tracing and Z-buffering techniques. Each of these attempts exploits some aspect of the coherence inherent in the visibility computation itself. None of them, however, simultaneously exploits object-space, image-space and temporal coherence.

Visibility algorithms are discussed generally in Foley, Van Dam, Feiner and Hughes, "Computer Graphics, Principles and Practice" (1990), Chap. 15, incorporated herein by reference. The dominant algorithms in use today for visibility computations are Z-buffer scan conversion and ray-tracing. Since Z-buffers do not handle partially transparent surfaces well, comparisons with Z-buffer techniques are best made with models consisting entirely of opaque surfaces. For these models, only rays from the eye to the first surface are relevant for visibility, so the choice is between Z-buffering and ray-casting (ray-tracing with no secondary rays).

The ray-tracing literature abounds with references to object-space coherence. A variety of spatial subdivisions have been used to exploit this coherence. See, for example, S. M. Rubin and T. Whirred, "A 3-dimensional representation for fast rendering of complex scenes," Computer Graphics, vol. 14, no. 3, pp. 110–116, July 1980; A. Glassner, "Space subdivision for fast ray tracing," IEEE CG&A, vol. 4, no. 10, pp. 15–22 (October 1984); D. Jevans and B. Wyvill, "Adaptive voxel subdivision for ray tracing," Proc. Graphics Interface '89, pp. 164–172, June 1989; T. Kay and J. Kajiya, "Ray tracing complex scenes," Computer Graphics, vol. 20, no. 4, pp. 269–278, August 1986; and Michael R. Kaplan, "The use of spatial coherence in ray tracing," in Techniques for computer graphics, etc. D. Rogers and R. A. Earnshaw, Springer-Verlag, New York, 1987, all of which are incorporated herein by reference.

Temporal coherence is much less commonly exploited in practice, but various techniques exist for special cases. For example, if all the objects are convex and remain stationary while the camera moves, then there are constraints on the way visibility can change (H. Hubschman and S. W. Zucker, "Frame to frame coherence and the hidden surface computation: constraints for a convex world," ACM TOG, vol. 1, no. 2, pp. 129–162, April, 1982, incorporated herein by reference) which a ray tracer might exploit. On the other hand, if the camera is stationary, then rays which are unaffected by the object motion can be detected and used from the previous frame. See, for example, David Jevans, "Object space temporal coherence for ray tracing," Proc. Graphics Interface, '92 Vancouver, B.C., pp. 176–183, May 11–15, 1992, incorporated herein by reference.

When interactivity is not an issue and sufficient memory is available, it can be feasible to render an entire animation sequence at once using spacetime bounding boxes. See, for example, A. Glassner, "Spacetime ray tracing for animation," IEEE CG&A, vol. 4, no. 10, pp. 15–22, October 1984, and J. Chapman, T. W. Calvert, and J. Dill, "Exploiting temporal coherence in ray tracing," Proceedings of Graphics Interface '90, pp. 196–204, 1990, both incorporated herein by reference.

While these techniques make good use of object-space coherence and sometimes exploit temporal coherence effectively, they unfortunately make little or no use of image-space coherence since each pixel is traced independently from its neighbors. There are heuristic methods which construct estimates of the results of ray-tracing a pixel from the results at nearby pixels (e.g. Sig Badt, Jr., "Two algorithms for taking advantage of temporal coherence in ray tracing," The Visual Computer, no. 4, pp. 123–132, 1988, incorporated herein by reference, but there seems to be no guaranteed algorithm which makes good use of image-space coherence in ray tracing.

With Z-buffer methods (and scan conversion methods in general) the problems are very different. Ordinary Z-buffer rendering is usually implemented with an initial set-up computation for each primitive followed by a scan-conversion phase in which the affected pixels are incrementally updated. This already makes very good use of image-space coherence, so the remaining challenge with Z-buffer methods is to exploit object-space and temporal coherence effectively.

A simple method of using some object-space coherence in Z-buffer rendering is to use a spatial subdivision to cull the model to the viewing frustum. See B. Garlick, D. Baum and J. Winger, "Interactive viewing of large geometric databases using multiprocessor graphics workstations," Siggraph '90 Course Notes (Parallel Algorithms and Architectures for 3D Image Generation), 1990, incorporated herein by reference. While this can provide substantial speed-ups, it exploits only a small portion of the object-space coherence in models with high depth complexity. In architectural models, for example, a great deal of geometry is often hidden behind walls yet lies within the viewing frustum.

In order to make use of more of the object-space coherence in architectural models, certain authors have proposed dividing models up into a set of disjoint cells and precomputing the potentially visible set (PVS) of polygons from each cell. See John Airey, "Increasing Update Rates in the Building Walkthrough System with Automatic Model—Space Subdivision and Potentially Visible Set Calculations," Technical Report TR90-027, The University of North Carolina at Chapel Hill, Department of Computer Science (1990); John Airey, John Rohlf, and F. Brooks. "Towards image realism with interactive update rates in complex virtual building environments," ACM SIGGRAPH Special Issue on 1990 Symposium on Interactive 3D Graphics, 24

(2) pp. 41–50, 1990; S. Teller and C. Sequin, "Visibility Preprocessing for Interactive Walkthroughs," Computer Graphics '91 (Proc. SIGGRAPH '91), 25 (4) pp. 61–69 (1991); and S. Teller and C. Sequin, "Visibility computations in polyhedral three-dimensional environments," U.C. Berkeley Report No. UCB/CSD 92/680, April 1992, all incorporated herein by reference. In order to render an image from any viewpoint within a cell, only the polygons in the PVS need be considered. These PVS schemes attempt to make good use of both object-space and image-space coherence. Nonetheless, they suffer from some important limitations. Before they can be used at all, they require an expensive precomputation step to determine the PVS and a great deal of memory to store it. Teller and Sequin, for example, report over 6 hours of precomputation time on a 50 MIP machine to calculate 58 Mb of PVS data needed for a model of 250,000 polygons.

Perhaps more importantly, the way these methods make use of cells may limit their appropriateness to architectural models. In order to achieve maximum acceleration, the cells must be 3D regions of space which are almost entirely enclosed by occluding surfaces so most cells are hidden from most other cells. For architectural models, this often works well since the cells can be rooms, but for outdoor scenes and more general settings, it is unclear whether or not PVS methods will be effective. In addition, the currently implemented algorithms make very special use of axially aligned polygons such as flat walls in rectilinear architectural models. While the methods can in principle be extended to use general 3D polygons for occlusion, the necessary algorithms are believed to have much worse computational complexity. Finally, although the implementations prefetch PVS data for nearby cells to avoid long latencies due to paging, they cannot be said to exploit temporal coherence in the visibility computation very effectively.

In Donald Meagher, "Efficient synthetic image generation of arbitrary 3-D objects," Proc. IEEE Conf. on Pattern Recognition and Image Processing, pp. 473–478, June 1982, incorporated herein by reference, a rendering algorithm is described which uses object-space octrees with image-space quadtrees. The algorithm described therein displays the octree itself rather than using it to cull a polygonal database, so that algorithm is directly applicable to volume, rather than surface datasets. Nonetheless this algorithm does make use of both object-space and image-space coherence, though it does not exploit temporal coherence.

Accordingly, there is a great need for a visibility algorithm which can take advantage of all three types of coherence in order to significantly speed up the rendering of 3D scenes.

SUMMARY OF THE INVENTION

According to the invention, roughly described, a visibility algorithm is provided which combines the strengths of both ray-casting and Z-buffering. To exploit object-space coherence, the technique uses an octree spatial subdivision roughly related to the type commonly used to accelerate ray tracing. To exploit image-space coherence, the technique augments traditional Z-buffer scan conversion with an image-space Z-pyramid that allows the algorithm to reject hidden geometry very quickly. Finally, to exploit temporal coherence, the technique uses the geometry that was rendered in the previous frame to construct a starting point for the rendering of the next frame. The result is an algorithm which is much faster than traditional ray-casting or Z-buffering for certain types of models. The technique is not difficult to implement and works for arbitrary surface datasets.

The hierarchical Z-buffer visibility algorithm uses an octree spatial subdivision to exploit object-space coherence, a Z-pyramid to exploit image-space coherence, and a list of previously rendered nodes to exploit temporal coherence. While the full value of the technique is achieved by using all three of these together, any of the three can also be used separately. Whether used separately or together, these data structures make it possible to compute the same result as ordinary Z-buffering at less computational expense.

As used herein, a polygon is hidden with respect to a Z-buffer if no pixel of the polygon is closer to the observer than the Z value already in the Z-buffer. Similarly, a cube is considered hidden with respect to a Z-buffer if all of its faces are hidden polygons. Finally, a node of the octree is considered hidden if its associated cube is hidden. Note that these definitions depend on the sampling resolution of the Z-buffer, since a polygon which is hidden at one Z-buffer resolution may not be hidden at another, finer resolution. Also, as used herein, an object is "provisionally visible" if an attempt has been made to prove the object hidden, but the attempt failed. The object may in fact turn out to be hidden, after all objects are rendered to the display, but whatever algorithm was used in the attempt to prove the object hidden was not able to do so.

With these definitions, the following basic observation makes it possible to combine Z-buffering with an octree spatial subdivision: If a cube is hidden with respect to a Z-buffer, then all polygons fully contained in the cube are also hidden. This means that if the faces of an octree cube are scan converted, and it is determined that each pixel of the cube is behind the current surface in the Z-buffer, all the geometry contained in that cube can safely be ignored.

From this observation, the basic algorithm begins by placing the geometry into the octree, associating each primitive with the smallest enclosing octree cube. Then starting at the root node of the octree, it is rendered using the following recursive steps: First, we check to see if the octree cube intersects the viewing frustum. If not, we are done. If the cube does intersect the viewing frustum, we scan convert the faces of the cube to determine whether or not the whole cube is hidden. If the cube is hidden, we are done. Otherwise, we Z-buffer any geometry associated with the cube and then recursively process its children in front-to-back order using the same algorithm.

We can construct the initial octree with a simple recursive procedure. Beginning with a root cube large enough to enclose the entire model and the complete list of geometric primitives, we recursively perform the following steps: If the number of primitives is sufficiently small such that further subdivision would probably result in making cube visibility testing more expensive than rendering the contained primitives, we associate all of the primitives with the cube and exit. Otherwise, we associate with the cube any primitive which intersects at least one of three axis-aligned planes that bisect the cube. We then subdivide the octree cube and call the procedure recursively with each of the child cubes (octants) and the portion of the geometry that fits entirely in that cube.

The basic recursive rendering algorithm has some very interesting properties. First of all, it only renders geometry contained in definitively visible octree nodes. Some of the rendered polygons may be hidden, but all of them are "nearly visible" in the following sense: there is some place we could move the polygon where it would be visible, which is no further away than the length of the diagonal of its containing octree cube. This is a large improvement over merely culling to the viewing frustum. In addition, the algorithm does not waste time on irrelevant portions of the octree since it only visits octree nodes whose parent nodes are definitively visible. Finally, the algorithm never visits an octree node more than once during rendering. This stands in marked contrast to ray-tracing through an octree where the root node is visited by every pixel and other nodes may be visited tens of thousands of times. As a result of these properties, the basic algorithm does a very good job of culling hidden geometry.

A weakness of the basic algorithm is that it associates some small geometric primitives with very large cubes if the primitives happen to intersect the planes which separate the cube's children. A small triangle which crosses the center of the root cube, for example, will have to be rendered anytime the entire model is not hidden. To avoid this behavior, there are at least two basic choices. One alternative is to clip the problematic small polygons where they intersect the faces of the child cubes, thereby creating two or more sub-primitives which each fit in smaller octree cubes. This has the disadvantage of increasing the number of primitives in the database. Another, preferred, alternative is to place some primitives in multiple octree cells. To do this, we modify the recursire construction of the octree as follows. If we find that a primitive intersects a cube's dividing planes, but is small compared to the size of the cube, then we no longer associate the primitive with the whole cube. Instead, we associate the entire primitive with all of the cube's children the primitive intersects. Since some primitives are associated with more than one octree node in this alternative, we can encounter them more than once during rendering. The first time we render them, therefore, we mark them as rendered, so we can avoid scan converting them more than once.

The object-space octree allows us to cull large portions of the model at the cost of having to scan-convert the faces of the octree cubes. Since the cubes may occupy a large number of pixels in the image, the scan conversion can be very expensive. In order to keep this cost to a manageable level, in another aspect of the invention, we rely on an image-space Z-pyramid. The Z-pyramid makes it possible to conclude very quickly in many cases that a large polygon is entirely hidden, making it unnecessary to scan convert the polygon. This method of testing the visibility of polygons can be applied to polygons in the model as well as cube faces.

The basic idea of the Z-pyramid is to use a conventional depth buffer (Z-buffer) as the finest level in the pyramid and then combine four Z values (a 2×2 window) at each level into one Z value at the next coarser level by choosing the farthest Z from the observer. Every entry in the pyramid therefore represents the farthest Z for a square area of the Z-buffer. At the coarsest level of the pyramid there is a single Z value which is the farthest Z from the observer in the whole image.

Maintaining the Z-pyramid is an easy matter. Every time we modify the Z-buffer by writing a new depth value into the finest granularity level, we propagate the new value through to coarser levels of the pyramid. As soon as we reach a level where the entry in the pyramid is already as far away as the new depth value, we can stop.

In order to use the Z-pyramid to test the visibility of a polygon, we find the finest-level sample of the pyramid whose corresponding image region covers the screen-space bounding box of the polygon. If the nearest Z value of the polygon is farther away than the sample in the Z-pyramid, we know immediately that the polygon is entirely hidden. This basic test quickly proves that a great many model polygons are entirely hidden and does the same for octree cubes since the visibility of a cube depends on the visibility of its polygonal faces.

While the basic Z-pyramid test can reject a substantial number of polygons, it suffers from a similar difficulty to the basic octree method. Because of the structure of the pyramid regions, a small polygon in the center of the image will have to be compared to the Z value at the coarsest level of the pyramid. While the test is still accurate in this case in that it will never fail to render a polygon that might be visible, it is not particularly powerful since such a small polygon will be rendered in many more frames than those in which it is ultimately visible.

A much more powerful test can be constructed by using the basic test recursively through the pyramid. When the basic test fails to show that a polygon is hidden, we go to the next finer level in the pyramid where the previous pyramid region has been divided into four quadrants. Here we attempt to prove that the polygon is hidden in each of the quadrants it intersects. For each of these quadrants, we compare the nearest Z value of the primitive to the value in the Z-pyramid. If the Z-pyramid value is closer, we know the primitive is hidden in the quadrant. If we fail to prove that the primitive is hidden in one of the quadrants, we go to the next finer level of the pyramid for that quadrant and try again. Ultimately, we either prove that the entire polygon is hidden, or we recurse down to the finest level of the pyramid and find a pixel covered by the polygon that has a Z-value farther away than the nearest Z value in the polygon. This recursire test culls a substantial fraction of the hidden primitives in an efficient manner.

The recursive test could be made completely definitive if instead of comparing Z-pyramid values to the nearest Z value in the whole polygon, we compared them to the nearest Z value of the polygon on pixel samples in the quadrant. This would, of course, require more computation at each level of the recursion than using the nearest Z value for the whole primitive at each step, but it would cull more primitives. Depending on the available hardware, this may be an attractive alternative.

Frequently, when we render an image of a complex model, only a small fraction of the primitives are visible. If we render the subsequent image in an animation, most of the primitives visible in the previous visible primitives will become hidden and some new primitives will become visible, but the frame-to-frame coherence in most animations ensures that there will be relatively few .changes in visibility for most frames (except scene changes and camera cuts). This observation holds regardless of whether the primitives are represented in an octree and regardless of whether Z-buffering is used to determine visibility.

In another aspect of the invention, we exploit this fact in a very simple way with the hierarchical visibility algorithm. We maintain a list of the rendered octree cubes from the previous frame in a "temporal coherence list" and, to render the next frame, we begin by simply re-rendering all the geometry in the cubes in the temporal coherence list, marking them as rendered. This can be done very quickly because we are not doing any visibility testing; we are merely rendering a list of primitives. This can be done with hardware acceleration if desired. We then take the resulting Z-buffer and use it to form the initial Z-pyramid. We then proceed with the above-described rendering algorithm to render any new geometry which is not provably hidden, skipping the cubes already rendered from the list. If there is sufficient frame-to-frame coherence, most of the visible geometry will already be rendered from the temporal coherence list, so the Z-pyramid test will be much more effective than in the first frame. The Z-pyramid test will be able to prove with less recursion that cubes and primitives are hidden. This can accelerate the rendering process substantially. After rendering the new frame, we update the temporal coherence list by checking each of the cubes on the list for visibility using the Z-pyramid test. This prevents the temporal coherence list from growing too large over time.

One way of thinking about the temporal coherence strategy is that we begin by guessing the final solution. If our guess is very close to the actual solution, the hierarchical visibility algorithm can use the Z-pyramid to verify the portions of the guess which are correct much faster than it can construct them from scratch. Only the portions of the image that it cannot verify as being correct require further processing.

BRIEF DESCRIPTION OF THE DRAWINGS

The invention will be described with respect to particular embodiments thereof, and reference will be made to the drawings, in which.

DETAILED DESCRIPTION

The invention is useful mainly with surface datasets, although aspects of the invention could well be used with volume datasets. In a surface dataset, objects in a model space are divided into "surface primitives", which in the preferred embodiment are planar polygons. Such primitives may in a particular embodiment even be limited to triangular planar polygons (i.e. triangles). As used herein, the term "object" is more generic than the term "primitive", since it may refer to a primitive, a cube, a face of a cube, and so on.

The invention relates to the manipulation of primitives in a model space in order to ultimately create an image on a display. While the primitives and indeed the model space itself may be completely abstract, having no correspondence to physical surfaces or spaces outside a computer memory, it is to be understood that they are still represented as physical signals in, for example, a computer memory. These physical signals are manipulated by the techniques described herein, and are subjected to various tests by the technique described herein, in order to simulate on the display a scene or scenes which would be visible to a person viewing corresponding physical surfaces in a physical space. Thus, phrases such as those referring to the depth of a portion of a surface, or the visibility of a portion of a surface, as used herein, are to be read merely as a shorthand way of defining not only the underlying steps performed by computer circuitry, but also the physical steps of receiving signals representing attributes of portions of the abstract surface, performing a manipulation or test of those signals corresponding to the steps which would be performed on physical surfaces, and generating physical output signals representing the indicated result.

In view of the above, it is understood that the present invention deals with physical entities such as physical signals that represent various numerical values, and hardware that inputs, processes and outputs such physical signals, as well as image data signals which ultimately cause a physical light image to be rendered on a display, observed by a viewer, and appreciated for its correspondence to a view of corresponding physical surfaces.

DATA STRUCTURES

Figure 1:
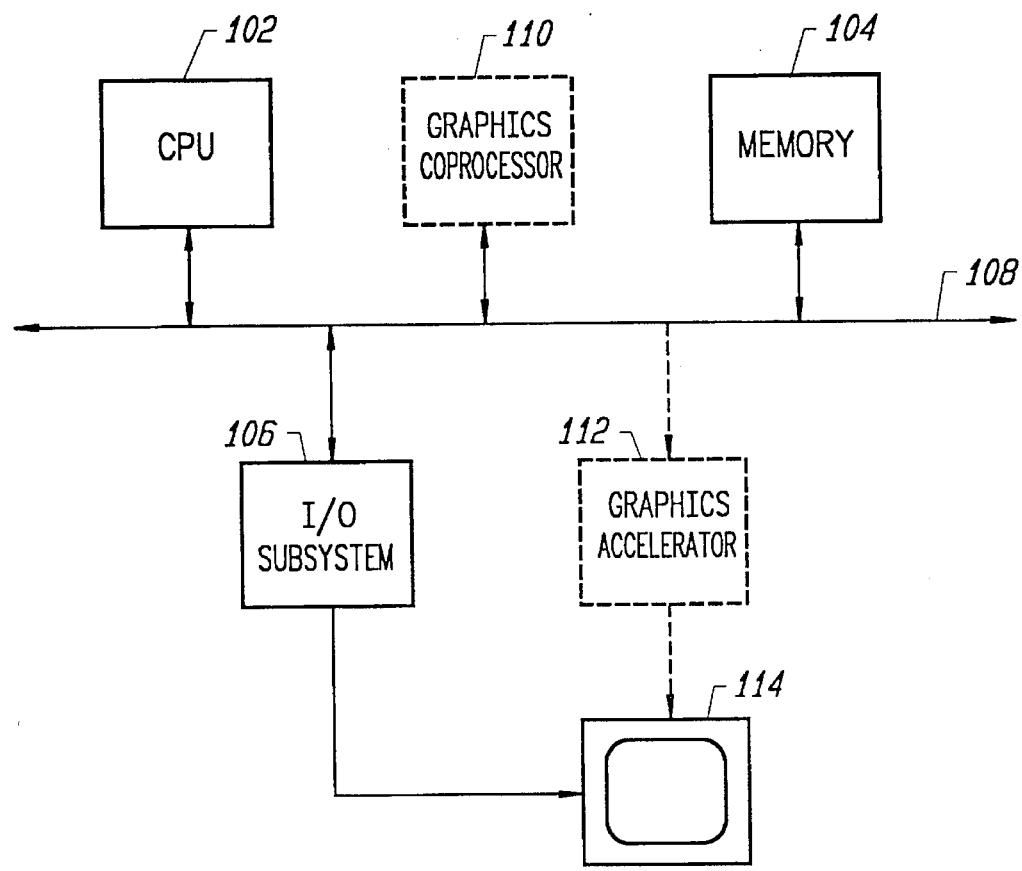
FIG. 1 is a block diagram of a computer system which may be used with the present invention.

FIG. 1 is a block diagram of an example of a computer system which may be used to perform the methods and maintain the data structures of the present invention. Although certain types of computer architectures might take better advantage of the invention than others, the invention can be implemented on virtually any type of architecture. In the architecture of FIG. 1, a CPU 102, a memory 104, and an I/O subsystem 106 are all connected to a bus 108. The CPU 102 issues signals over the bus 108 for reading and writing to the memory 104 or to the I/O subsystem 106, in order to manipulate data in the manner described herein. The I/O subsystem 106 may also be capable of issuing signals over the bus 108 in order to access memory 104. The system might also include a graphics coprocessor 110, which can offload from the CPU 102 many of the memory-intensive tasks required for manipulating the graphics data in memory 104. In such situations, the display, illustrated in FIG. 1 as 114, is often driven by the I/O subsystem 106. In other systems, a graphics accelerator 112 is connected to the bus 108 and to the display 114. In these systems, the display buffer is typically held inside the graphics accelerator 112 which can not only write specific attributes (e.g. colors) to specific pixels of the display 114 as requested by CPU 102, but can also draw more complicated primitives on the display 114 under the command of CPU 102. Graphics accelerators often implement a conventional, one-level form of depth buffer internally.

Figure 2:
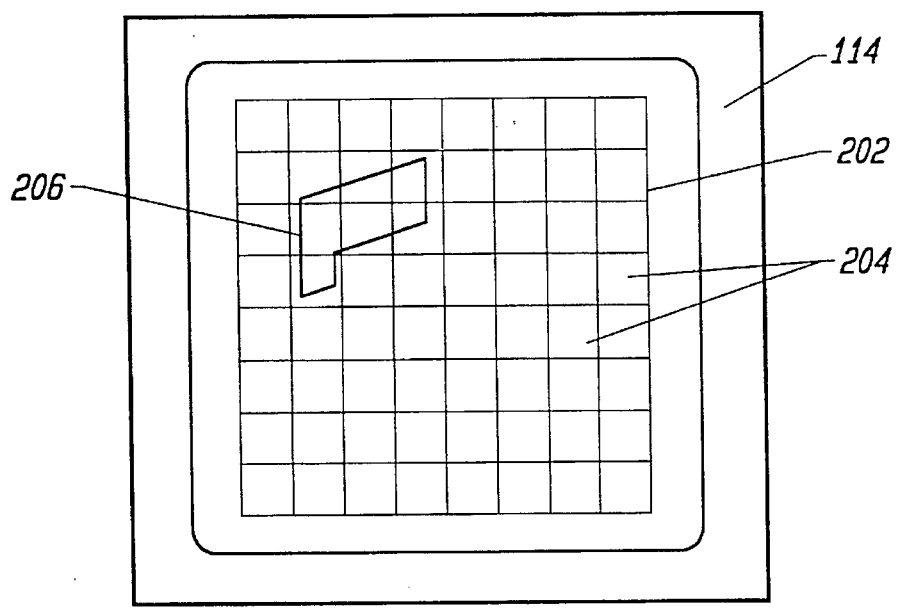
FIG. 2 is a front view of a display.

FIG. 2 is a front view of a typical display 114. It includes a display area 202, which is divided, as a result of the logic circuitry which drives the scanning electron beam, into a plurality of display cells 204. The display cells 204 may be the same as what is commonly known as "pixels". As used herein, the term "display cell" need not be square and, in its most general sense, need not even have the same size or shape on different parts of the display area 202 (although it is preferable if they do).

Shown on the display 114 in FIG. 2 is a surface primitive 206. The surface primitive 206 is represented in memory (for example, memory 104 in FIG. 1) as being in a specific location in a three-dimensional model space, and its appearance on the display 114 represents a projection of the three-dimensional primitive 206 onto the two-dimensional "image-space" of the display area 202. As shown in FIG. 2, it can be seen that the projection of primitive 206 "covers" seven of the display cells 204, in that a portion of the surface 206 occupies at least a portion of seven of the display cells 204. As used herein, the surface primitive 206 is therefore considered divided into seven "surface cells", each corresponding to the display cell which it occupies. Each of the display cells has associated with it not only attributes (such as color) which are to appear in the corresponding display cell, but also a depth value indicating the relative depth within the frame appearing on display 114, at which that surface cell is to appear. In particular implementations, depth values can be increasing with increasing depth, or can be decreasing with increasing depth. Since the invention is not restricted to one such implementation or the other, depth values are simply referred to herein as being "farther" or "nearer" to the viewer than other depth values.

Figure 3:
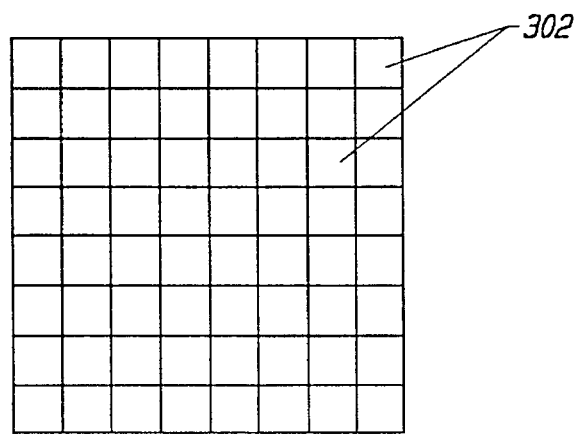
FIG. 3 illustrates a display buffer for the display of FIG. 2.

FIG. 3 shows a display buffer for the display 114. As mentioned, the display buffer can be in memory 104 (FIG. 1), or in another display driver or graphics accelerator such as 112. It comprises various memory elements 302, one corresponding to each of the display cells 204. Each "display cell element" contains a "display cell value" which represents an attribute of the appearance of the respective display cell on the display 114, such as color.

Figure 4:
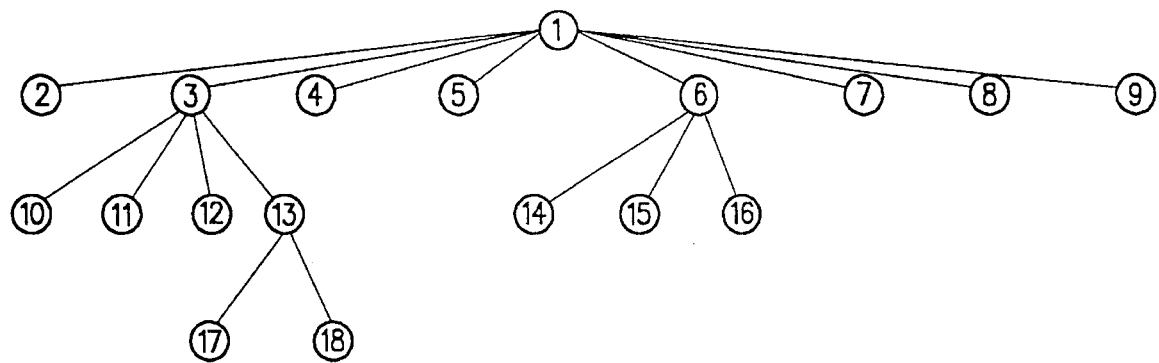
FIG. 4 illustrates an octree data structure which might be used with the invention.

As mentioned above, an aspect of the invention involves associating primitives with nodes of an octree. Each node of the octree represents a cubical section of an overall enclosing model space, defined by a recursive subdivision of that model space. FIG. 4 shows an octree as it might be represented in a computer memory, such as memory 104. As can be seen, it is made up of a plurality of nodes beginning with a root node #1. The spatial cube corresponding to node #1 is the entire overall model space within which all of the primitives reside. Node #1 has eight "child nodes" 2–9, each of which corresponds to a respective cubic octant of the cube corresponding to the parent node #1.

Node #3 of the octree of FIG. 4 itself has four children, namely nodes 10–13. The other four children of node #3 represent empty space and therefore are coded as null pointers. Node #6 has three children, 14–16. Nodes 10–13 are considered "children" of their "parent" node 3, and they are also considered "descendants" of both their "parent" node #3 and "grandparent" node #1. Similarly, nodes 14–16 are children of their parent node #6 and descendants of both their parent node #6 and their grandparent node #1. Nodes 10–13 correspond to four respective ones of the possible eight octants of the cube corresponding to node #3, and nodes 14–16 correspond to three respective ones of the eight octant cubes of the cube corresponding to their parent node #6. Node #13 also has two children, 17 and 18, each corresponding to a respective octant cube of the cube corresponding to node #13. Nodes 2, 4, 5, 7–12 and 14–18 are considered "leaf nodes" since they have no children.

The following is a C-language type definition which may be used to implement the octree of FIG. 4:

```
/* data structure for an octree node */
struct octree_node {
    int NP; /* no. of polygons associated with this node and its
        children */
    int np; /* no. of polygons associated with this node */
    int *poly_ids; /* polygons associated with this node - list of id
        numbers */
    unsigned char level; /* level in octree */
    short x,y,z; /* cube coordinate */
    float min[3],max[3]; /* 3D min/max box of node */
    struct octree_node *pc[8]; /* pointers to child nodes */
    char is_leaf; /* is node a leaf node? (TRUE/FALSE) */
};
```

Although the regularity of an octree cubic subdivision of the space containing the surface primitives is preferred, in a general sense the invention can be used with other types of hierarchical spatial subdivisions. For example, neither the overall model space nor the individual "sub-spaces" corresponding to a node in the tree need be cubic, nor must the sub-spaces associated with all of the child nodes of a given parent node all be of the same size and shape. Nor must they necessarily completely fill the sub-space associated with the parent node. The use of a regular cubic octree, however, permits certain optimizations described hereinafter, which might be forfeited if a different form of hierarchical spatial subdivision is used.

Figure 5:
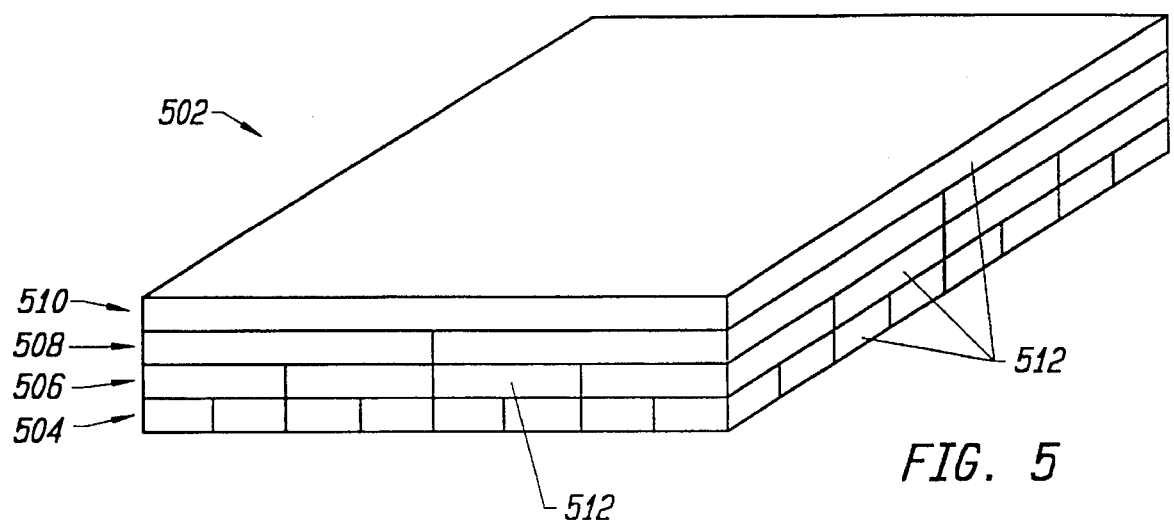
FIGS. 5 and 5A illustrate a depth buffer which might be used with the invention.
Figure 5A:
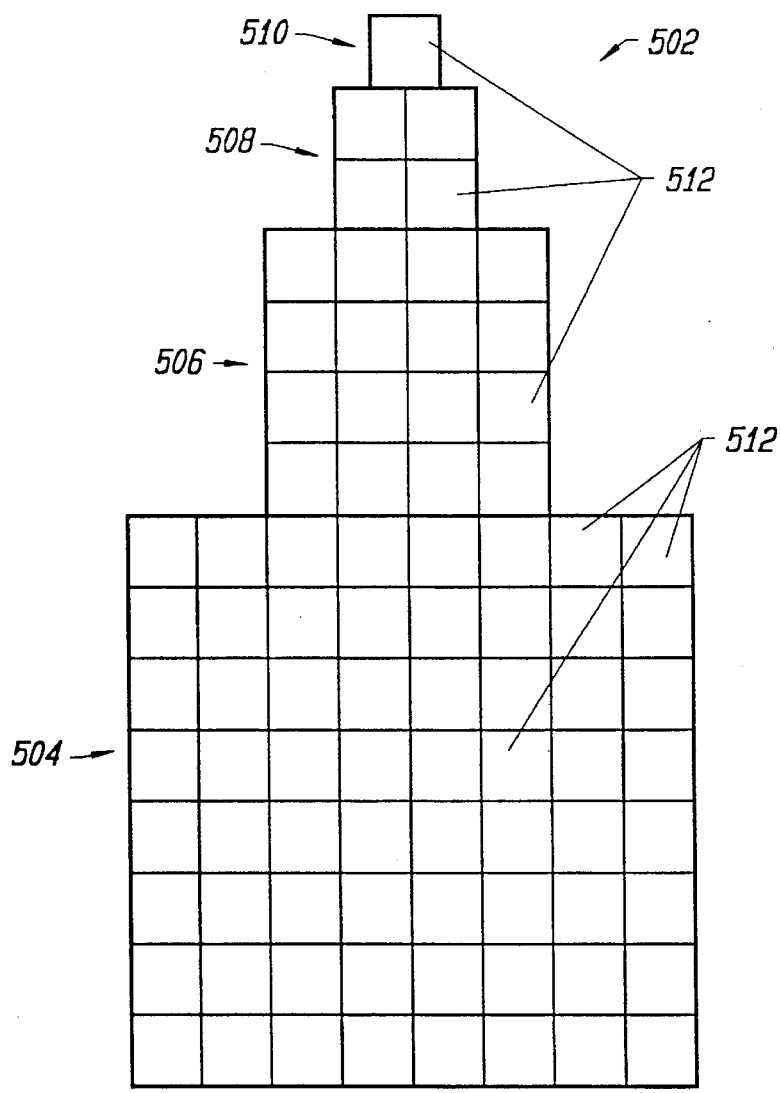

FIG. 5 illustrates how a depth buffer (Z-buffer) for use with the present invention might be envisioned. Another conception is illustrated in FIG. 5A, with like elements being given like designations. A depth buffer for use with only an 8×8 array of display cells is illustrated in FIGS. 5 and 5A for simplicity, and it will be understood that the illustration could be extended to implementations with many, many more display cells. The depth buffer 502 (FIG. 5) is divided into four levels of granularity or resolution designated 504, 506, 508 and 510, proceeding from the finest granularity level 504, to and including the coarsest granularity level 510. In the finest granularity level 504, the depth buffer has a "depth element" 512 corresponding to each of the display cells 204 (FIG. 2). Each of these depth elements contains a "depth value", indicating the depth of the surface cell whose color was most recently written to the display element 302 corresponding to the same display cell 204 to which the depth element 512 corresponds. Thus, the first-level 504 of depth buffer 502 is substantially the same as a conventional depth buffer.

Level 506 of depth buffer 502 is immediately coarser than level 504. It contains only a 4×4 array of depth elements, each of which "covers" or is "superior" to a respective group of four of the depth elements in the immediately finer level 504. In fact, if each depth element 512 in the finest granularity level 504 is considered to "cover" a respective one of the display cells 204, then the level 506 is defined such that each of its depth elements 512 "covers" a 2×2 region of the display cells 204. The depth value contained in each of the depth elements 512 in level 506 is the same as the farthest depth value contained in any of the depth elements which it covers in level 504. Thus the "depth elements" 512 in level 506 are sometimes also referred to herein as "Z-max elements". (The depth elements 512 in the finest granularity level 504 are also sometimes referred to herein as Z-max elements for convenience, although they each contain the maximum depth of only one display cell 204).

Level 508 of depth buffer 502 is immediately coarser than level 506, and it contains only a 2×2 array of Z-max elements. Like the Z-max elements 512 in level 506, each of the Z-max elements 508 "covers" four of the Z-max elements in the immediately finer level. The Z-max elements 512 in level 508 are defined such that each "covers" a 2×2 region of the display cells covered by the corresponding Z-max elements in the immediately finer level, which is actually a 4×4 region of the display cells 204. Each Z-max element 512 in level 508 contains the farthest depth of all of its corresponding Z-max elements in level 506 which, due to the transitive nature of the "farthest" operator, is also the farthest depth of all of the display cells 204 covered by the Z-max element 512.

Level 510 of depth buffer 502 is immediately coarser than level 508, and it contains only one Z-max element. Like the Z-max elements 512 in level 508, the Z-max element in level 510 "covers" four of the Z-max elements in the immediately finer level. The Z-max element in the level 510 is defined such that it "covers" a 2×2 region of the display cells covered by the corresponding Z-max elements in the immediately finer level, which is actually the full 8×8 region of display cells. The Z-max element 512 in level 510 contains the farthest depth of all of its corresponding Z-max elements in level 508, and therefore in fact contains the farthest depth of all of the display cells in the display buffer.

For some purposes, as described in more detail hereinafter, it will be seen that it may be desirable to include not only Z-max elements in a depth buffer such as 502, but also Z-min elements. That is, each of the depth elements 512 can contain not only a Z-max element having the farthest depth of any display cell covered by the depth element 512, but also a Z-min element containing the nearest depth value of any of the display cells 204 covered by the depth element 512.

While the depth buffer 502 may be conceptualized as shown in FIG. 5 or 5A, it is represented physically in memory 104 (FIG. 1) as a data structure. A C-language type definition for such a data structure is set forth below.

```
/* data structure for Z-pyramids */
#define NLEV_MAX 12
struct zpyramid {
    int no_levels; /* no. of levels in pyramid */
    int res[NLEV_MAX]; /* image resolution at pyramid
    level */
    FLOAT *Zmin[NLEV_MAX]; /*   Zmin pyramid levels
                                (floating point depth
                                image) */
    FLOAT *Zmax[NLEV_MAX]; /*   Zmax pyramid levels
                                (floating point depth
                                image) */
};
```

As with the octree data structure shown in FIG. 4, while the depth buffer illustrated in FIGS. 5 and 5A is preferred since it permits certain optimizations, it will be understood that in a general sense the invention can be used with other variations of such a depth buffer. For example, a display area 202 might be covered by two or more separate depth buffers 502, each covering its own portion of display area 202. This type of structure might be useful for a parallel processing approach to the techniques described herein. As another example, the display regions covered by the depth elements in granularity levels coarser than the finest granularity level 504, need not be square, or even of all the same size, as long as each of the depth elements in a given level covers all of the same display cells as its corresponding group of depth elements in the immediately finer level. Other variations will be apparent.

PROCEDURES

Figure 6:
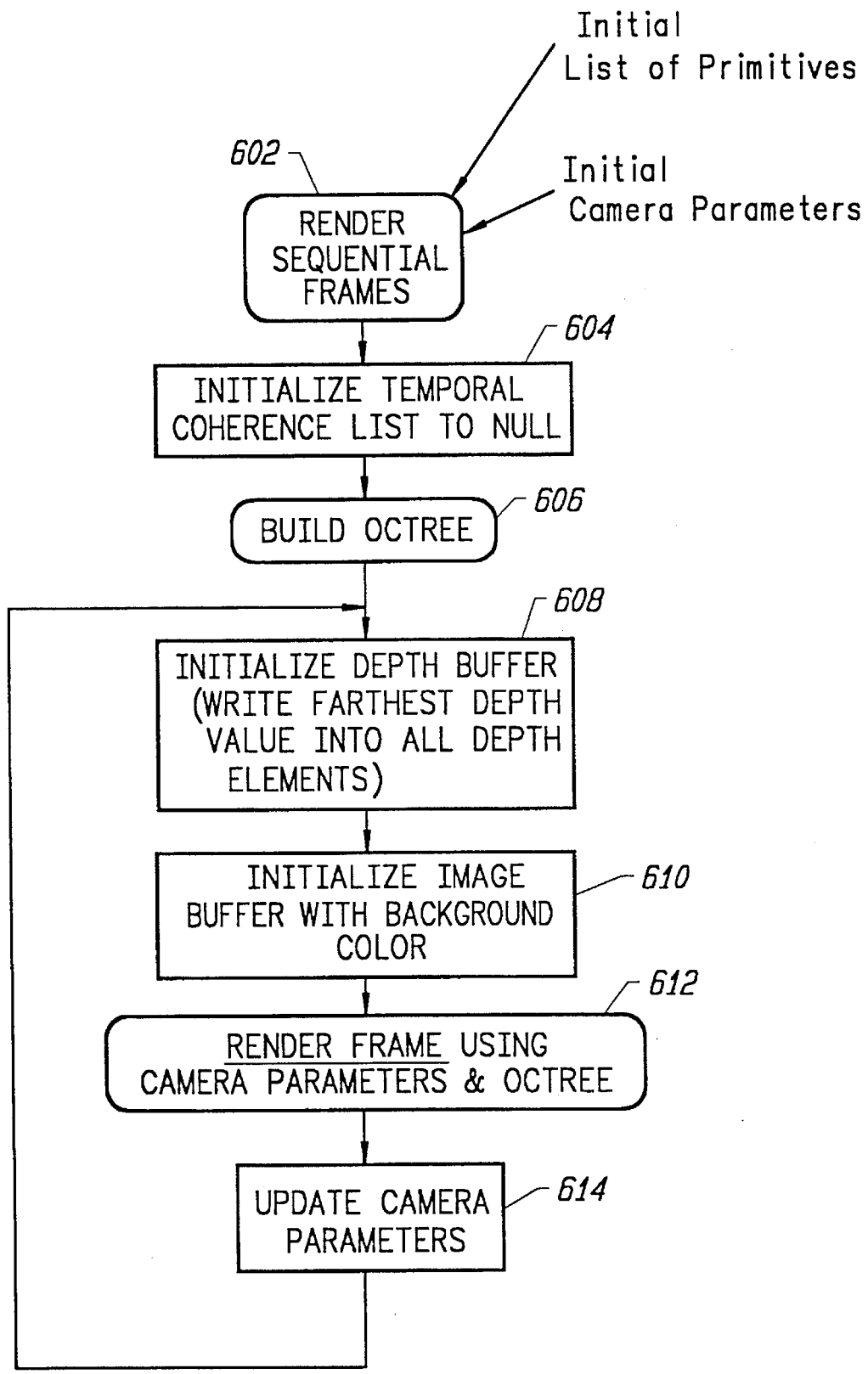
FIGS. 6–10, 12, 14–18, 19A, 19B, 19C and 20 are flowcharts of procedures which may be used to implement the present invention.

FIG. 6 is an overall flowchart of a procedure which may be used to implement the present invention. This embodiment incorporates all three primary aspects of the invention, and at various points in the description it is pointed out how the embodiment can be modified if it is desired to use less than all three primary aspects of the invention. The first few flowcharts illustrate how the invention can take advantage of temporal coherence in rendering sequential frames of a model. As used herein, a "frame" is the two-dimensional image which a viewer sees when viewing all of the surface primitives of a model from a particular viewpoint.

The procedure 602 of FIG. 6 renders the sequential frames from an initial list of primitives. The procedure 602 is also provided with initial camera parameters from which to view the model. Camera parameters include such information as the camera viewpoint, direction and orientation, and view angle.

In a step 604, a temporal coherence list is initialized to null. The temporal coherence list may be merely a list of pointers to objects which have been rendered.

In a step 606, the octree is built from the initial list of primitives. Note that as previously mentioned, the invention can take advantage of temporal coherence without using an object-space octree to render objects, but the use of such an octree is preferred.

In a step 608, the depth buffer 502 (FIG. 5) is initialized by writing the farthest depth value permitted into all Z-max elements 512. If depth values increase in the embodiment with increasing depth, then step 608 might write into all of the Z-max elements 512 the largest number representable in the computer memory space allocated for each Z-max element. If depth values decrease with increasing depth, then step 608 might write the negative number having the largest representable magnitude into all of the Z-max elements 512.

In step 610, the image buffer (FIG. 3) is initialized with a background color in the usual manner. Control then passes to a "render frame" routine 612, which renders the frame of the primitives in the octree using the camera parameters provided. Again, it is not necessary that either the object-space octree or the hierarchical depth buffer be used in the broadest aspects of the routine 612 in order to take advantage of temporal coherence.

After the frame is rendered, it is assumed that the camera parameters can be changed for the next frame. The parameters are therefore shown in FIG. 6 as being updated in step 614. After all necessary changes have been made, the procedure loops back to step 608 to re-initialize the depth buffer and the image buffer (step 610) and render the next frame (Step 612). The camera parameters are then updated again in step 614, and the procedure again loops to step 608 to render a third frame, and so on.

The procedure of FIG. 6 illustrates only the steps to be performed to render sequential scenes of a static model, where only the camera parameters can be changed from frame to frame. In order to support dynamic models, the algorithm can be modified in ways that will be apparent to persons of ordinary skill, without deviating from the invention. For example, a single octree might be used to represent both static and dynamic elements of the model, and that octree can be modified at each frame to reflect the movement of the dynamic objects. As another example, one octree might be used to represent the static objects and a second octree might be used to represent the dynamic objects. The two octrees would then be rendered separately and the results composited together. Many other alternatives are possible.

Figure 7:
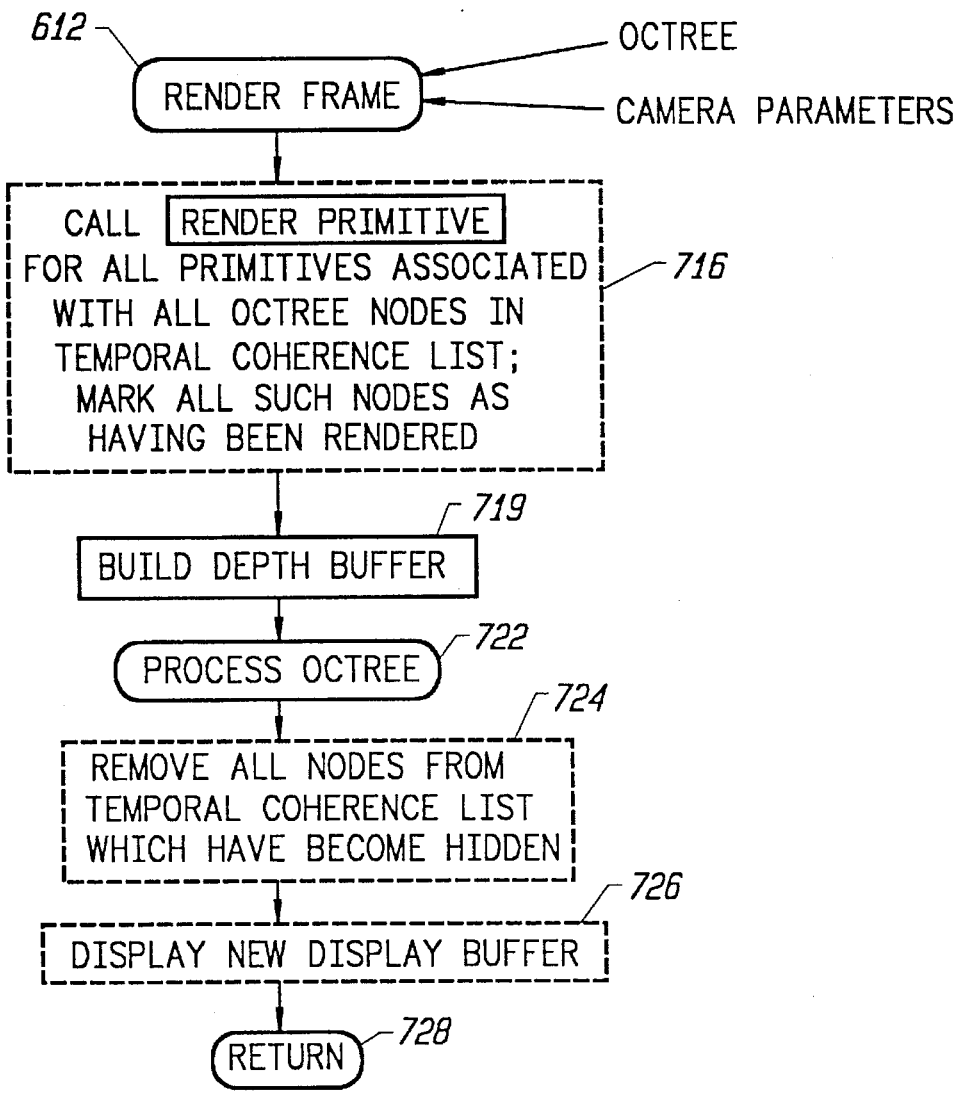
Figure 8:
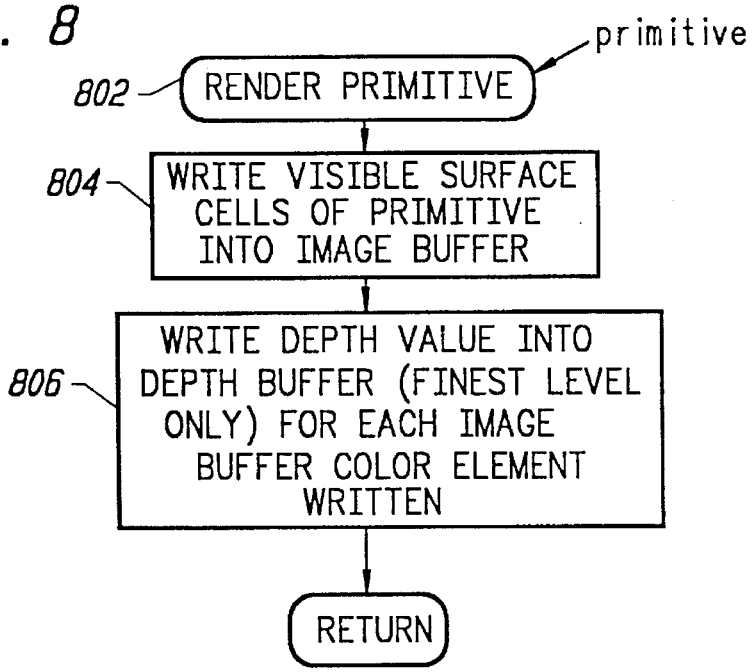

The details of the "render frame" procedure are set forth in FIG. 7, where it can be seen how the temporal coherence list is used. Referring to FIG. 7, in step 716, all of the primitives associated with all of the octree nodes which are presently in the temporal coherence list are first rendered in a conventional manner. (Step 716 is shown dotted to indicate that it would be omitted if the temporal coherence list is not being used.) For example, FIG. 8 shows a conventional "render primitive" routine 802 for a given provided primitive. In a step 804, the render primitive routine writes all the visible surface cells of the supplied primitive into the image buffer (FIG. 3), and in step 806, it writes the corresponding depth values of the visible surface cells into only the finest level of the depth buffer 502. The render primitive routine 802 then returns to the render frame routine 612 (FIG. 7). Note that the render primitive routine 802 can be performed by certain types of conventional pipelined graphics accelerators in hardware without requiring any software overhead.

Step 716 also marks each of the nodes on the temporal coherence list as having been rendered.

Returning to FIG. 7, after all of the primitives in all of the octree nodes in the temporal coherence list are rendered by the render primitive routine (step 716), the entire depth buffer 502 is built from the finest granularity level (step 719). A procedure for accomplishing this is described below.

In step 722, the octree is processed by a "process octree" routine which renders all of the octree nodes which are visible and which have not already been marked as rendered. As explained below in more detail, the "process octree" routine 722 can skip nodes whose parents are hidden. Note that if the aspects of the invention involving the octree spatial subdivision are not being used, then the routine "process octree" would be substituted with another routine appropriate to the data structure which is being used.

In step 724, if the temporal coherence list is being used, all of the nodes on the temporal coherence list whose bounding cubes have become hidden are removed from the temporal coherence list. It can be seen that only the nodes which were on the list from the prior frame need be tested for continued visibility in step 724, since all of the nodes which were added to the list in step 722 are by definition provisionally visible according to the visibility algorithm used. It is also worth noting that step 724 need not be performed after every new frame, since failure to remove newly hidden nodes from a temporal coherence list merely results in more primitives being rendered unnecessarily. That degradation might be minimal enough that the time required to render those unnecessary primitives is shorter than the time required to determine which nodes on the list have become hidden since the last frame. Thus, for example, step 724 may be performed once every n frames.

In step 726, the new contents of the display buffer (FIG. 3) are displayed on the display (FIG. 2) and the render frame procedure 612 returns in a step 728 to the render sequential frames routine 602 (FIG. 6). Step 726 is shown dotted in FIG. 7 in order to emphasize that this aspect of the invention can provide advantages not only in situations where the sequential frames are to be displayed in real time, but also in situations where the sequential frames are to be stored for subsequent display as a slide show, for example.

While many of the flowcharts included and described herein show steps being performed in a specified sequence, it will be understood that many steps can be performed in different sequences than that shown in the flowchart. The flowcharts are intended to illustrate the functional steps to be performed, rather than necessarily the sequence in which they are to be performed, although it will be apparent to a person of ordinary skill that certain steps must be performed before other steps (for example, a prior frame must be rendered before a subsequent frame can be rendered). In the render frame procedure 612, for example, steps 716 and 719 both can be performed within a larger iteration of octree nodes in the temporal coherence list, rather than rendering all of the primitives in the list in step 716, and subsequently updating the depth buffer in step 719.

Figure 9:
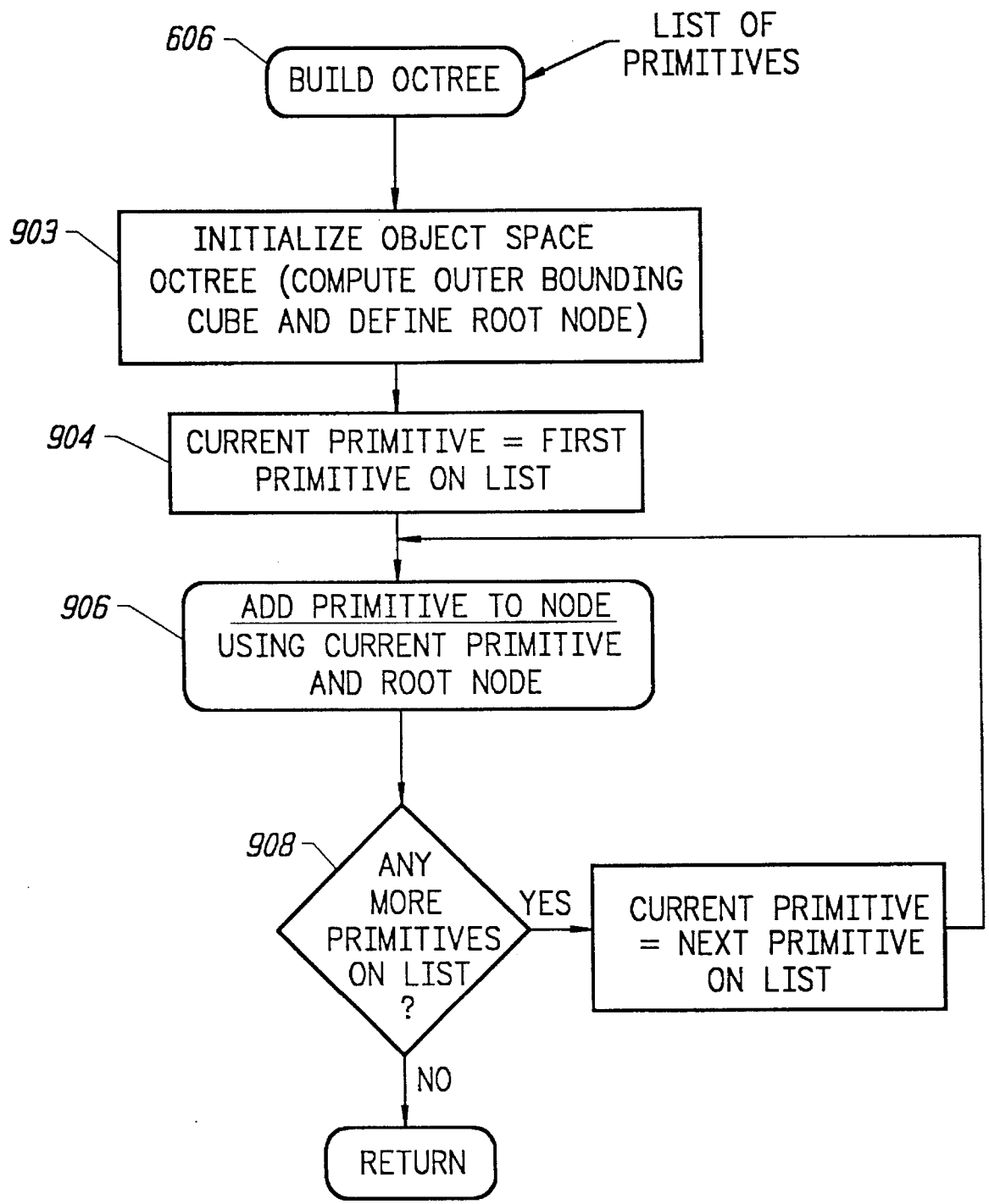

FIG. 9 is a flowchart of the "Build Octree" step 606 (FIG. 6). In a step 903, the object space octree is initialized by computing an outer bounding cube of the model, allocating memory space for the root node of the octree, and writing the information regarding the outer bounding cube thereto. In step 904, a "current primitive" variable is initialized to the first primitive on the list of primitives provided to the "Build Octree" routine 606.

The routine then enters a loop beginning with step 906, with a call to an "add primitive to node" routine using "current primitive" and the root node. As will be seen, the "add primitive to node" step 906 begins at the supplied node, and recursively determines to which of that node or its descendants the supplied primitive should be associated. The "add primitive to node" routine 906 also creates descendants of the supplied node as required.

After the current primitive has been added to the octree, decision step 908 determines whether there are any more primitives on the list provided to the routine 606. If so, then the "current primitive" variable is incremented to point to the next primitive on the list, and the routine loops back to step 906 to add the next primitive to the node.

Figure 10:
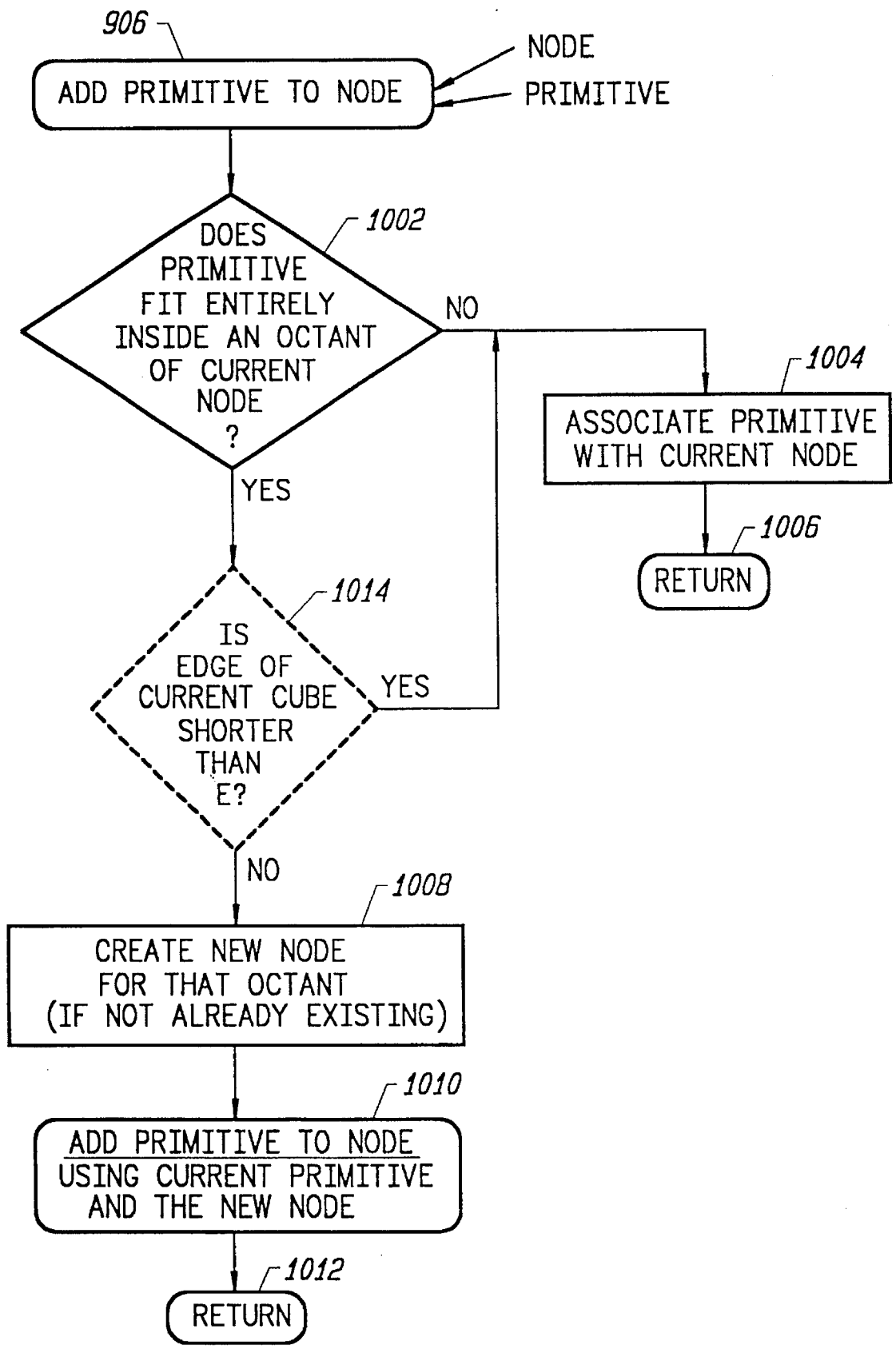

FIG. 10 is a flowchart of the recursive procedure, add primitive to node 906. The routine is supplied with a primitive to be added and a starting node. As mentioned, the first time this routine is called for a given primitive to be added, the starting node will be the root node. In a step 1002, the routine first decides whether the supplied primitive fits entirely inside an octant of the current node (initially the node supplied to the routine). If not, then the cube associated with the current node is the smallest cube which encloses the supplied primitive. The routine therefore associates the primitive with the current node (step 1004) and returns (step 1006).

If the primitive does fit entirely inside an octant of the current node, then the routine creates a new child for that octant if it does not already exist (step 1008), and recursively calls the "add primitive to node" routine 906 using the current primitive and the new node (step 1010). The recursion continues until the primitive no longer fits entirely within an octant of the cube associated with whatever node is then the current node, at which time steps 1004 and 1006 in the then-current recursion are taken as previously mentioned. When the recursion ends, the routine returns to the caller in step 1012.

An epsilon test 1014 may be inserted after it is determined (step 1002) that the primitive fits entirely inside an octant of the current node. Specifically, a step 1014 may be inserted at that point to determine whether an edge of the current cube is shorter than some minimum length epsilon. If so, then control passes to step 1004 in order to associate the primitive with the current node and return (step 1006) to the caller. If not, then the routine proceeds to step 1008 in the manner previously described.

The Build Depth Buffer step 719 (FIG. 7) can be performed iteratively from the second finest granularity level of depth buffer 502 to coarsest level of the depth buffer 502. Within each level, an inner iteration is performed to visit each of the depth elements (Z-max elements) in that level. For each such Z-max element, the depth value which is written into that element is the farthest depth value in any of the Z-max elements which are covered by such Z-max element in the next finer granularity level. If the depth buffer 502 also includes Z-min elements, then the inner iteration also visits each of the Z-min elements in the current level. For each such Z-min element, the depth value which is written into that element is the nearest depth value in any of the Z-min elements which are covered by such Z-min element in the next finer granularity level. (For the purposes of this description, note that if Z-min values are included in depth buffer 502, then in each level coarser than the finest granularity level, one Z-min element is maintained for each Z-max element in such levels. But in the finest granularity level, the Z-min elements and the corresponding Z-max elements can be one in the same element since the value contained in each of the depth elements 512 in the finest granularity level 504, in addition to being the farthest depth value of the one display cell covered by the depth element, is also the nearest depth value of the one display cell covered by the depth element.)

Returning again to FIG. 7, as previously mentioned, after all the octree nodes which have been rendered from the temporal coherence list have been marked (step 720), all the primitives associated with provisionally visible nodes not already rendered are themselves rendered (step 722).

Figure 15:
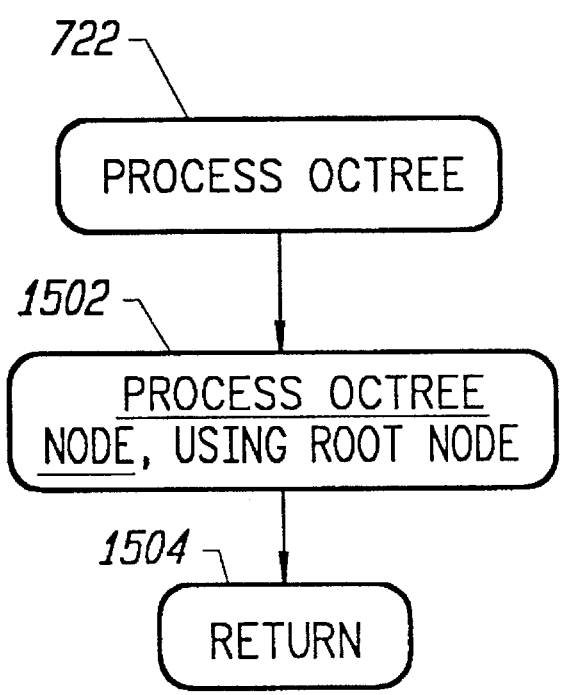

A flowchart of step 722 is illustrated in FIG. 15. As can be seen, it comprises merely a call to a recursive routine "Process Octree Node" (step 1502) followed by a return to the caller (step 1504). The routine 722 provides the root node as an argument to the "Process Octree Node" procedure 1502.

Figure 16:
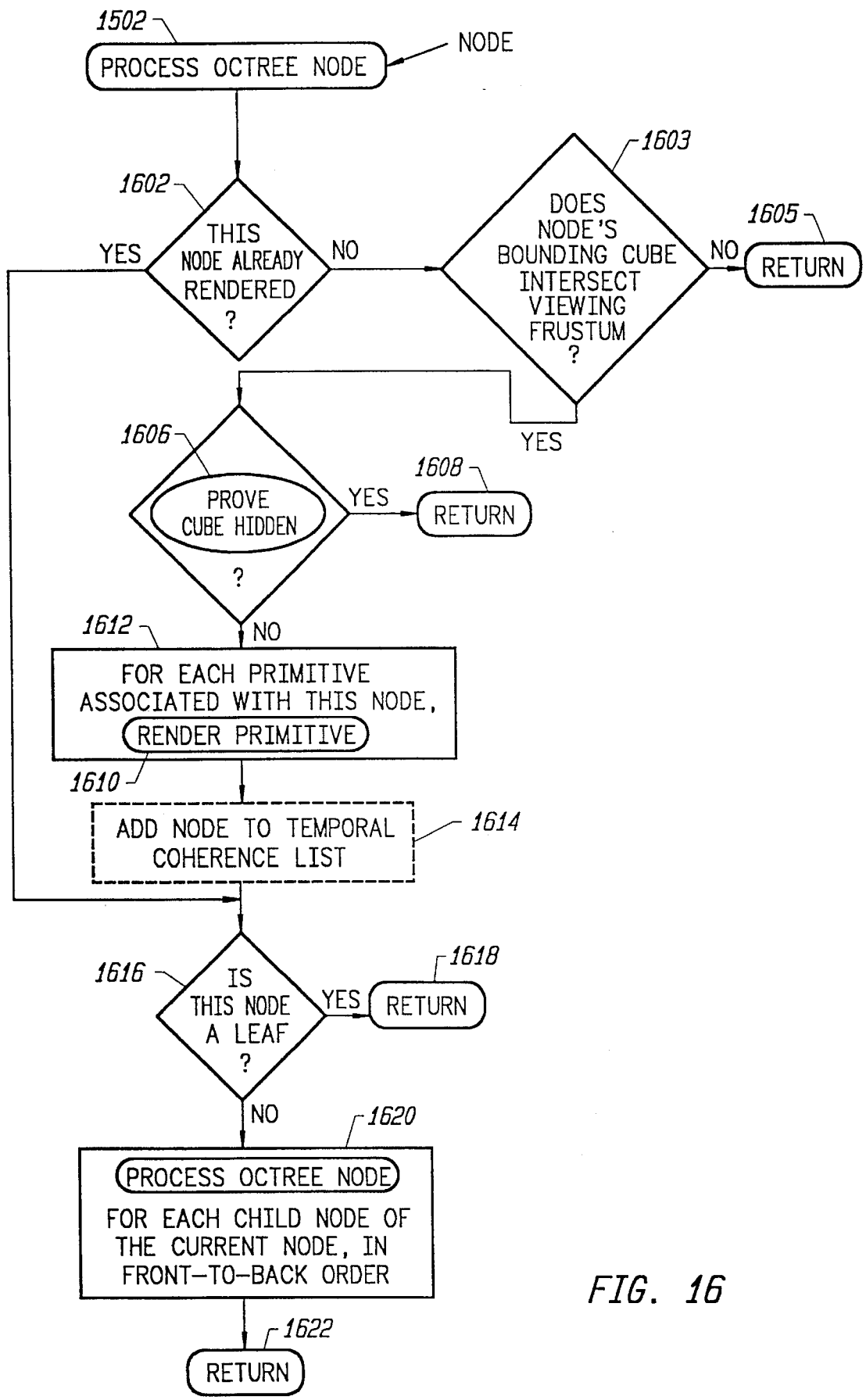

The recursive procedure "Process Octree Node" 1502 is illustrated in FIG. 16. It begins in a decision step 1602, in which it is determined whether the node has already been rendered (for example, due to its inclusion on a temporal coherence list). If so, then the routine skips to decision step 1616, described below, without re-rendering the node.

If the node has not yet been rendered, then a decision step 1603 determines whether the node's bounding cube (i.e. the cube which has been associated with the node) intersects the viewing frustum. Any conventional technique can be used to make this determination, but a preferred technique uses the principles set forth in the Appendix hereto.

If the node's bounding cube does not intersect the viewing frustum, then the routine returns (step 1605). Otherwise, another decision step 1606 determines whether the cube associated with the node is itself hidden. A procedure for determining whether the cube is hidden is discussed below with respect to FIG. 17, but briefly, it involves determining whether all of the forward-facing faces of the cube, of which there may be one, two or three, are themselves hidden. If the cube is hidden, then nothing within it or all of its descendants need be rendered and the routine returns (step 1608).

If the cube cannot be determined definitively to be hidden, then the routine calls a procedure 1610 to render each primitive which is associated with the present node (step 1612). The routine 1610 also updates the depth buffer 502 (all levels) for the surface cells of the primitive which are rendered.

After all the primitives associated with the present node have been rendered, if a temporal coherence list is being used, the present node is added thereto in a step 1614. In step 1616, a decision is made as to whether the present node is a leaf node. If it is, then the recursion is complete and the routine returns (step 1618). If not, then in a step 1620, the routine iterates through each of the child nodes of the present node in front-to-back order and, for each such child node, recursively calls the "Process Octree Node" routine 1502. As previously mentioned, each node which is not a leaf node can have any number of children up to eight. The front-to-back sequence of nodes can be determined as follows:

1. The first child to render is the node whose octant is nearest the viewpoint. This may be determined as the octant through which a vector, from the center of the current node to the viewpoint, passes. If this determination is made in the current cube's coordinate frame, only the signs of coordinates need be examined.

2. The three immediate neighboring octants of the forwardmost octant are next, though any order within that group of three is permissible since nothing in any of these three octants can obscure anything in another of the three octants.

3. The fifth, sixth and seventh nodes to render are those whose octants are immediately adjacent to the octant diagonally opposite the forwardmost octant. Again, the sequence within octants five, six and seven is unimportant.

4. The last node to render is the node whose octant is diagonally opposite that of the forwardmost octant in the current cube.

After the recursion completes for the last of the children of the current node, the routine 1502 returns to the caller (step 1622).

Figure 17:
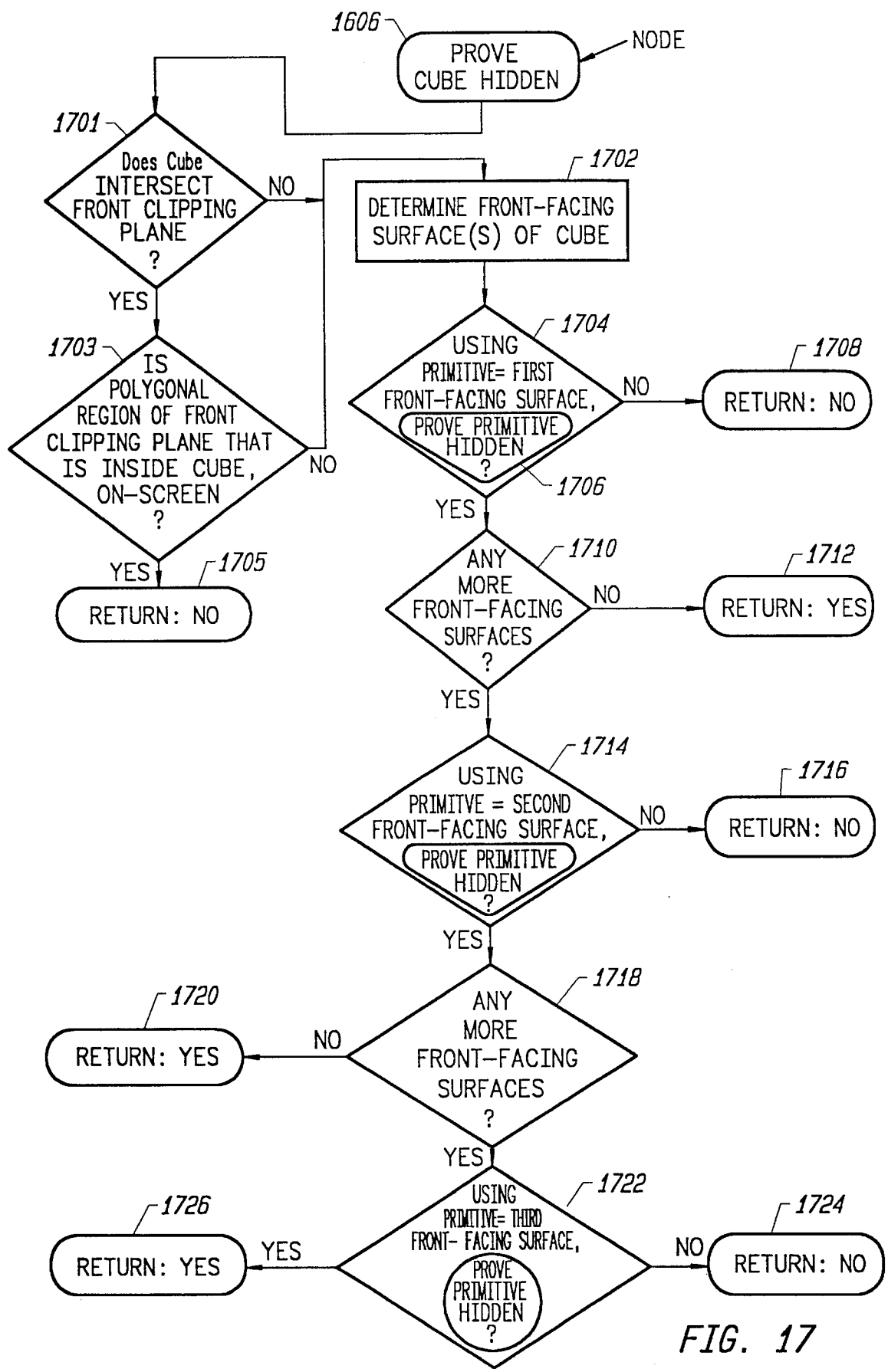

FIG. 17 is a flowchart of the procedure 1606 which determines whether a cube is definitively hidden or not. Note that this routine 1606 can also be used in step 724 (FIG. 7) to determine which nodes on the temporal coherence list have become hidden in the course of rendering the current frame. In a step 1701, it begins by determining whether the cube whose node is provided to the routine intersects the front clipping plane. If so, then the routine determines whether the polygonal region of the front clipping plane which is inside the cube, is on-screen (step 1703). If so, then the cube is definitively visible and the routine returns negatively (step 1705).

If either of the decision steps 1701 or 1703 are negative, then the routine finds the front facing surface(s) of the cube whose node is provided to the routine (step 1702). At least one, and no more than three, such surfaces will be found.

In a step 1704, the first such front facing surface of the cube is passed to a "prove primitive hidden" routine 1706 to determine whether that face is definitively hidden. If that face cannot be definitively determined to be hidden, then the routine returns negatively (i.e. with an indication that the cube corresponding to the node provided to the routine could not be determined to be definitively hidden) (Step 1708). If the first front-facing face is definitively determined to be hidden, then step 1710 determines whether there are any more front-facing surfaces. If not, then the routine returns (step 1712) affirmatively, that is, with an indication that the cube has been determined definitively to be hidden.

If there are more front-facing surfaces, then step 1714 calls the "prove primitive hidden" routine 1706 to determine whether the second front-facing surface is definitively hidden. If not, then the routine returns negatively (step 1716), and if so, then step 1718 determines whether there is yet a third front-facing surface. If not then the routine returns affirmatively (step 1720), and if so then step 1722 again calls the "prove primitive hidden" routine 1706 to attempt to prove that the third front-facing surface of the cube is hidden. If the "prove primitive hidden" routine 1706 returns negatively then routine 1606 also returns negatively (step 1724), and if it returns positively then routine 1606 also returns positively (step 1726).

It can be seen that the "prove cube hidden" routine 1606 returns affirmatively if and only if all of the front-facing surfaces of the cube can be proved hidden definitively, and returns negatively if any of the front-facing surfaces cannot be proved to be definitively hidden. The prove cube hidden routine 1606 can of course be rewritten as a loop.

Figure 18:
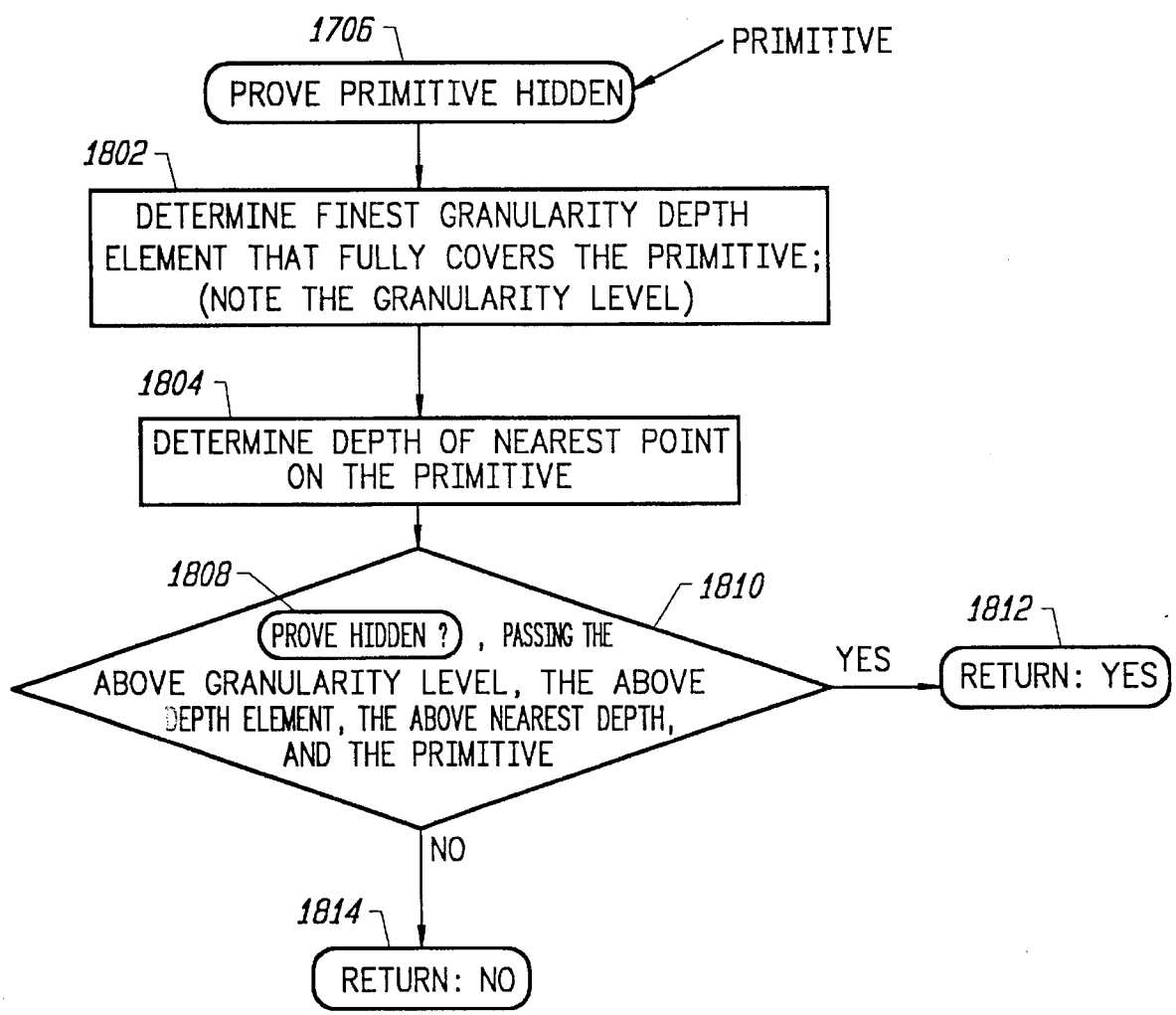

FIG. 18 is a flowchart of a procedure which may be used to implement the "prove primitive hidden" decision step 1706. In a step 1802, the routine 1706 first determines the finest granularity depth element in depth buffer 502 which fully covers the primitive (or surface, such as a cube surface) provided to the routine. Step 1802 also makes a note of the level of that depth element. In a step 1804, the routine determines the depth of the nearest point on the primitive. For planar polygonal primitives, the nearest depth of the point on the primitive is the nearest vertex of the polygon.

The routine then calls a recursive procedure 1808, "prove hidden", passing the granularity level noted in step 1802, the depth element which fully covers the primitive, a reference to the primitive, and the nearest depth of the primitive (step 1810).

The "prove hidden" routine begins with the granularity level passed to it, and attempts to determine whether the primitive (or sub-primitive) passed to it is hidden at that granularity level of the depth buffer 502. If it cannot prove the primitive hidden at the current granularity level, then it divides the primitive into sub-primitives, each covered by a respective one of the corresponding depth elements at the next finer granularity level. It then calls the prove hidden routine 1808 again for each of those sub-primitives, in an attempt to determine whether all of those sub-primitives are definitively hidden at such next finer granularity level. The routine also has an optional decision step which can terminate the recursion negatively and quickly if Z-min elements are used, since these elements permit a possible definitive determination of visibility.

Figure 19A:
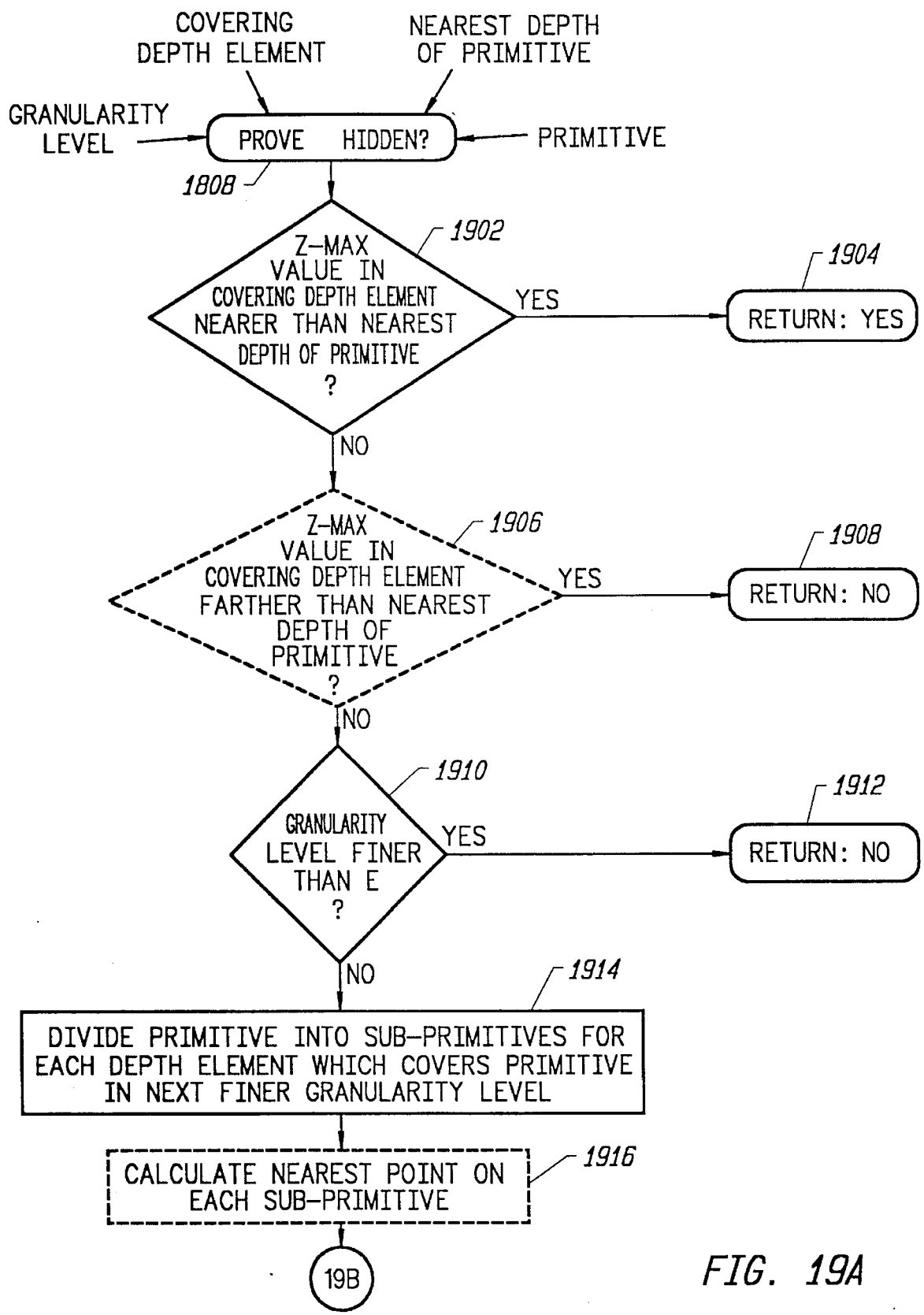
Figure 19B:
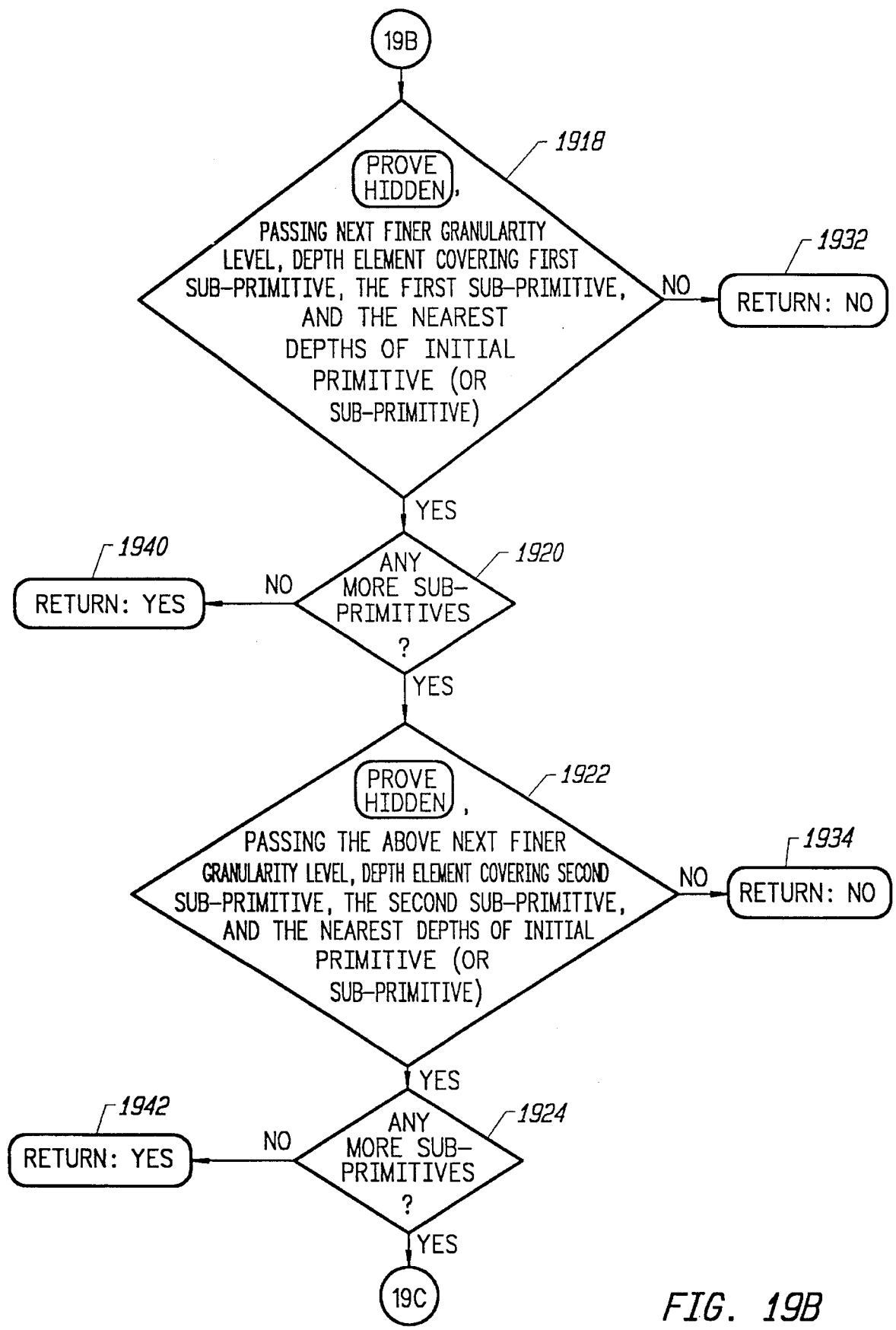
Figure 19C:
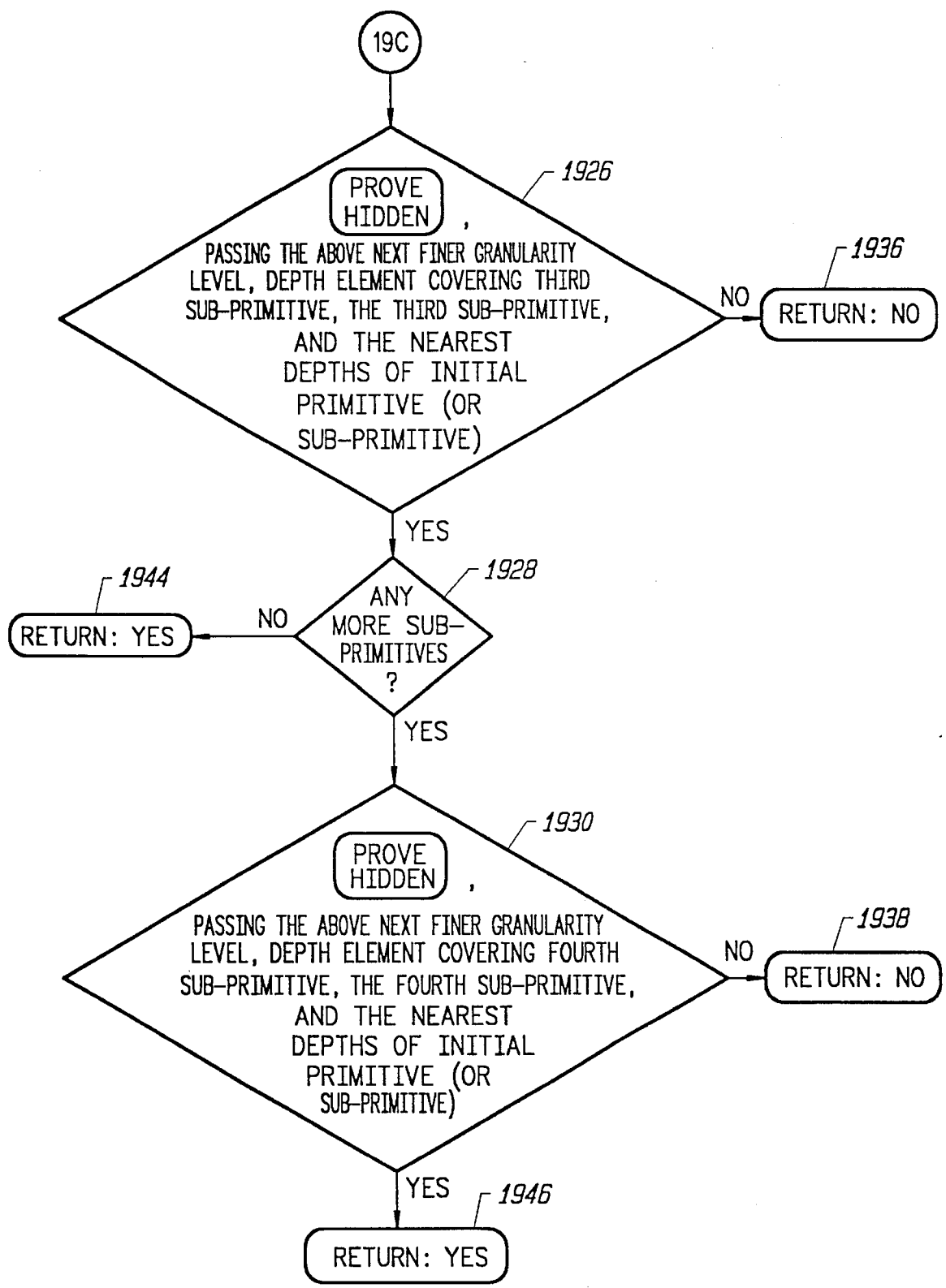

The flowchart of the "prove hidden" routine 1808 begins with FIG. 19A, continues with FIG. 19B, and terminates with FIG. 19C. Referring to FIG. 19A, the routine begins by deciding whether the Z-max value in the covering depth elements provided to the routine is nearer than the nearest depth of the primitive, also provided to the routine (step 1902). If so, then the primitive (or sub-primitive) provided to the routine has been definitively determined to be hidden, and the routine returns affirmatively (step 1904).

If not, then if the depth buffer 502 contains Z-min values, then optional step 1906 compares the Z-min value in the covering depth element provided to the routine to the nearest depth of the primitive, also provided to the routine (step 1906). If the Z-min value is farther than the nearest depth of the primitive, then the primitive has been definitively determined to be at least partly visible and the routine returns negatively (step 1908).

In step 1910, an epsilon test is used to decide whether it is worthwhile continuing with finer granularity levels in the attempt to prove the primitive hidden. Specifically, if the granularity level passed to the routine is already finer than some level epsilon, the routine returns negatively (step 1912). That is, it returns with an indication that it was not able to prove the primitive definitively hidden.

If further recursion is desirable, then a step 1914 divides the primitive provided to the routine into sub-primitives for each depth element which covers the primitive in the next finer granularity level. Skipping step 1916 for the moment, and continuing with FIG. 19B, the routine iterates through all of such sub-primitives and for each one, recursively calls the "prove hidden" routine 1808 with the next finer granularity level, the depth element in depth buffer 502 which covers the sub-primitive in such next finer granularity level, a reference to the sub-primitive itself, and the nearest depths of the initial primitive which was provided to the routine 1808 initially (steps 1918, 1920, 1922, 1924, 1926, 1928 and 1930). If any one of these calls to "prove hidden" returns negatively, indicating that the routine was not able to prove one of the sub-primitives hidden, then the routine returns to the next higher level negatively as well, indicating that the primitive with which the routine was initially called also cannot be proven definitively to be hidden. (Steps 1932, 1934, 1936 and 1938). The iterations can terminate as soon as one of such calls returns negatively.

If all of the calls in the iteration return affirmatively, indicating that all of the sub-primitives of the initially provided primitive have been definitively proven hidden, then the routine returns affirmatively to the next higher level, indicating that the primitive provided to the routine is definitively hidden. (steps 1940, 1942, 1944 and 1946). Only when there are no more sub-primitives in the iteration can such an affirmative return be made.

As described so far, the "prove hidden" routine 1808 includes a simplification which, while avoiding certain computation, will fail to prove certain primitives hidden which could be proven hidden if the computation is performed. Specifically, since the depth of the primitive, which is passed to each next-level recursion of the "prove hidden" routine 1808, is the nearest depth of the overall primitive passed initially to the top level of the "prove hidden" routine 1808, each recursion of the routine is testing only whether that depth is farther than the farthest display cell covered by a particular one of the Z-max elements. Thus the routine is essentially trying to prove hidden a projection of the initial primitive onto a plane which is entirely at the depth of the nearest point on the primitive. This will not preclude accurate rendering, since any error is on the side of unnecessarily attempting to render an object which is already hidden by objects rendered previously. The only penalty is in the time required to render the object unnecessarily. However, in a given implementation it may be more desirable to perform additional computations than to render such objects unnecessarily.

Accordingly, in optional step 1916, the routine calculates the nearest point on each sub-primitive. The recursive calls in steps 1918, 1922, 1926 and 1930 to the "prove hidden" routine 1808 for each of the sub-primitives then pass the nearest depth of the particular sub-primitive rather than of the initial overall primitive. As mentioned, this option requires additional calculation, but might prove more primitives hidden.

Returning to FIG. 18, if the primitive has been proven to be hidden at the finest granularity level of the depth buffer 502 having a depth element which fully covers the primitive (step 1810), then the "prove primitive hidden" routine 1706 returns affirmatively (step 1812). If not, then the routine returns negatively (step 1814).

Referring back to FIG. 16, as previously mentioned, step 1606 attempts to prove that the cube corresponding to the node supplied to the Process Octree Node routine 1502 is definitively hidden. If not, then in step 612, the routine calls a procedure 1610 for each of the primitives associated with the current node to render the primitive. This may be accomplished either in a conventional manner using conventional Z-buffering techniques, preferably using a hardware accelerator, followed, of course, by an update of coarser levels of the depth buffer 502. Alternatively, a routine 1610 as illustrated in FIG. 20 is used to render the primitive.

Figure 20:
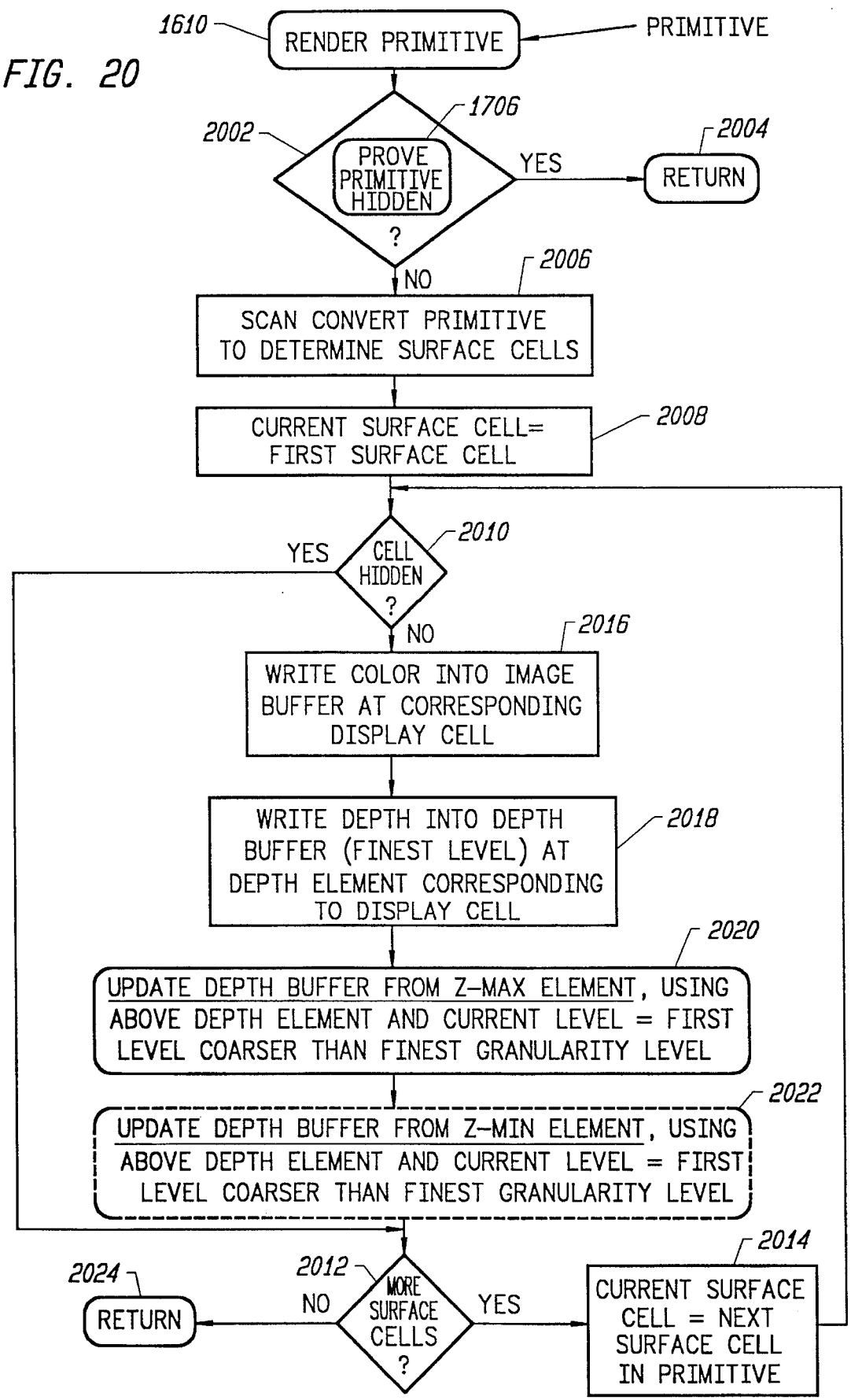

Referring to FIG. 20, the routine begins by attempting to prove that the primitive passed to it is hidden (step 2002). The "prove primitive hidden" routine 1706, previously described, can be used for this purpose. If it is determined definitively to be hidden, then the "render primitive" routine 1610 returns without rendering anything (step 2004).

If step 2002 fails to prove the primitive hidden, a step 2006 scan converts the primitive in a conventional manner to determine the surface cells that it contains (i.e. the display cells that it covers). The routine then sets a "current surface cell" variable to the first surface cell in the primitive (step 2008), and enters an iteration in which each such cell is rendered if it is visible relative to objects which have previously been written. In particular, step 2010 determines whether the particular surface cell is hidden. This is a conventional determination made by comparing the depth of the current surface cell to the depth value currently in the depth buffer 502 at the finest level for the corresponding display cell. If step 2010 determines that the cell is hidden, then the surface cell is not written to the display buffer 302, and if there are any more surface cells in the primitive (step 2012), then the "current surface cell" is incremented to point to the next surface cell of the primitive (step 2014), and the routine loops back to step 2010.

If the current display cell is not hidden relative to pixels already written to the display buffer (FIG. 3), then the routine writes the color or other attribute of the current surface cell into the display buffer of the corresponding display cell in the conventional manner (step 2016). It also writes the depth of the current surface cell into the depth buffer (at the finest level) at the depth element corresponding to the display cell in the conventional manner (step 2018).

In step 2020, the coarser levels of depth buffer 502 are updated by calling an "update depth buffer from Z-max element" routine 1104 (FIG. 12), using the depth element just written and using as the current level the first level coarser than the finest granularity level in the depth buffer 502 (step 202). Optionally, in step 2022, if the depth buffer 502 includes Z-min elements as well, these elements are also updated by calling "update depth buffer from Z-min element" routine 1302 (FIG. 14) using the same depth element and the same current level. Note that steps 2020 and 2022 can be performed after the entire primitive is rendered, if desired, rather than within the iteration of surface cells. Note also that rather than scan converting the primitive in its entirety and subsequently writing color and depth values for the scan-converted cells, this routine can be modified to instead write the color and depth values one-by-one as they are encountered during scan conversion.

After the depth buffer 502 has been updated, if there are any more surface cells to render (step 2012), then the next surface cell is rendered in the manner just described. After all the surface cells of the primitive have either been written or determined to be hidden, then the routine returns (step 2024).

Figure 12:
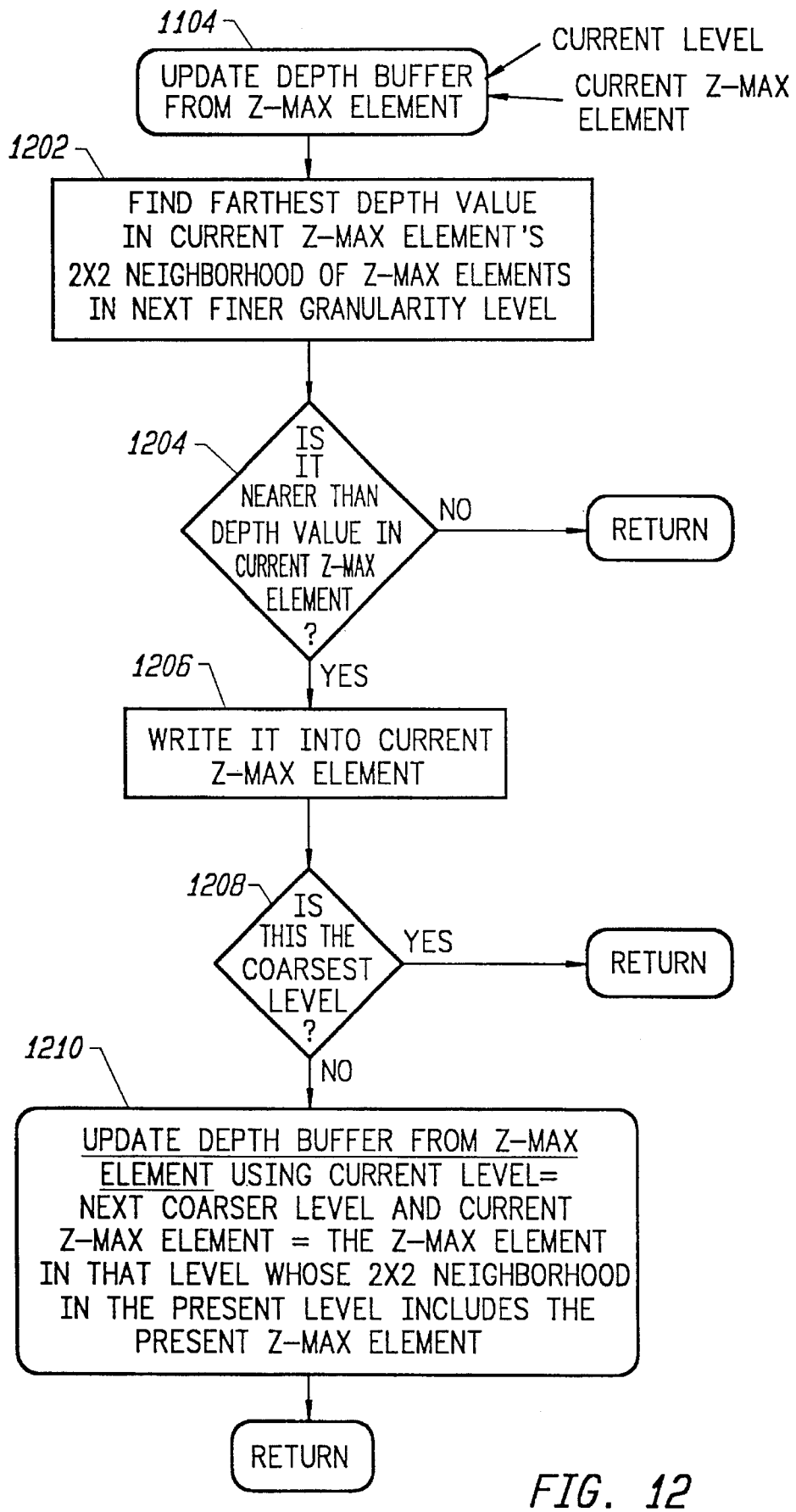

The "update depth buffer from Z-max element" routine 1104 is a recursive procedure illustrated in the flowchart of FIG. 12. It is called with a current level and a current Z-max element. Referring to FIG. 12, in a step 1202, the routine first finds the farthest depth value in the current Z-max element's 2×2 neighborhood of Z-max elements in the next finer granularity level. If this depth value is nearer than the depth value presently in the current Z-max element (decision step 1204), then this farthest depth value is written into the current Z-max element (step 1206). If we have not yet reached the coarsest level of the depth buffer (decision step 1208), then the routine 1104 recursively calls itself using the next coarser level as the current level, and using the Z-max element in that immediately coarser level which is immediately superior to the present Z-max element (step 1210). The recursion proceeds until the farthest depth value in the Z-max elements covered by a current Z-max element is no longer nearer than the depth value in the current Z-max element (step 1204). It can be seen that updating need not proceed to any coarser level through another recursion when this occurs, since no coarser level Z-max element will ever be changed. The recursion also terminates, of course, after the coarsest level 510 has been reached and updated if necessary (step 1208).

Figure 14:
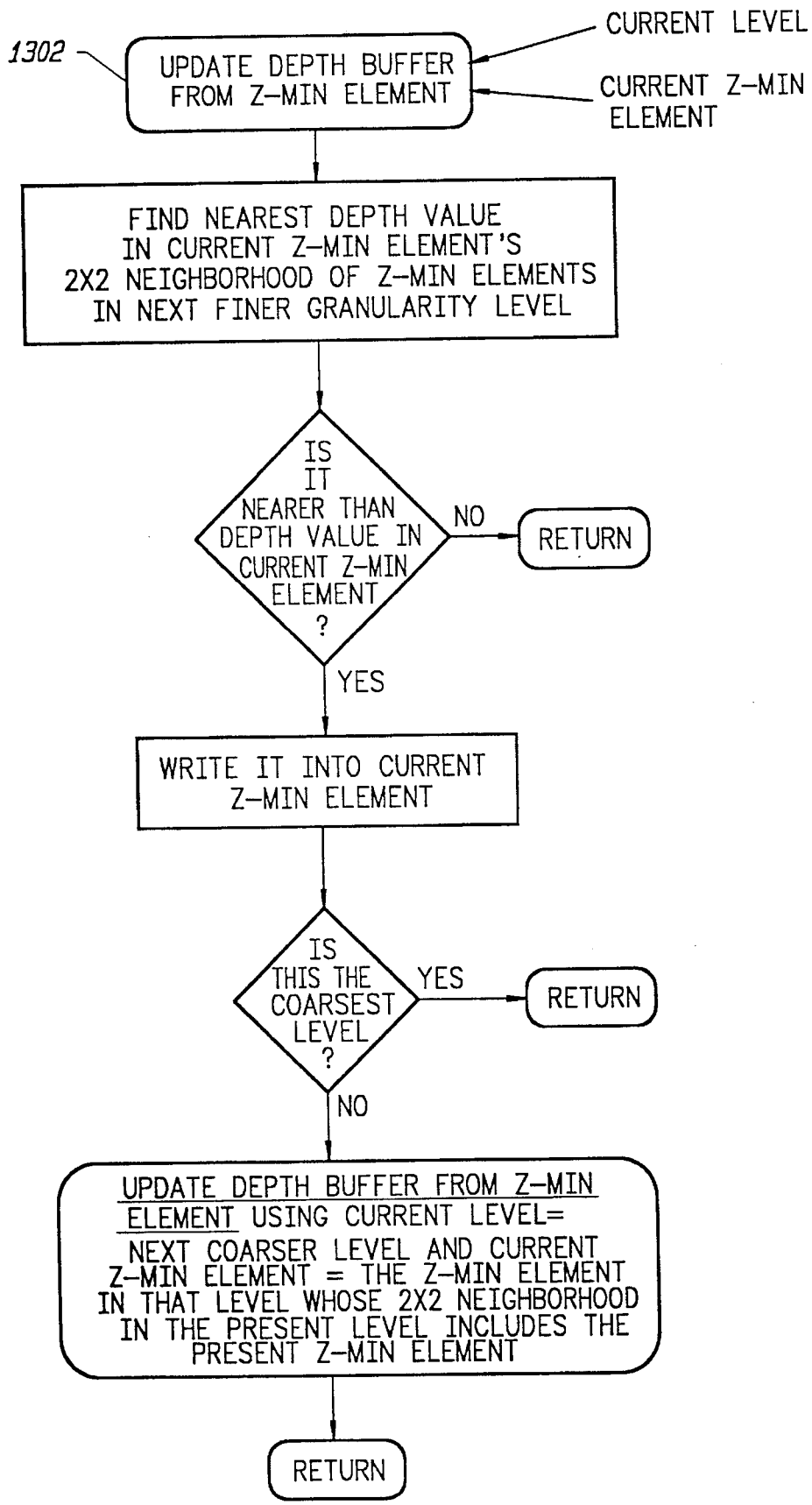

The "update depth buffer from Z-min element" is a recursive procedure illustrated in the flowchart of FIG. 14. It is identical to the procedure 1104 of FIG. 12. except that it propagates the nearest depth value of covered display cells up to higher granularity levels, rather than propagating the farthest depth value. Otherwise, the routine 1302 is identical to the routine 1104 and need not be further described.

EFFECTIVENESS

One initial implementation of the hierarchical visibility algorithm is based on general purpose, portable C code and software scan conversion. This implementation uses the object-space octree, the image-space Z-pyramid and the temporal coherence list. Even for relatively simple models, the pure software algorithm is often faster than traditional software Z-buffering, and for complex models, the acceleration can be very large.

For a first test of the algorithm, an office module made up of 15,000 polygons is constructed and then replicated as a cell in a three dimensional grid. Each cell includes a stairway with open space making it possible to see parts of neighboring floors. None of the office walls goes all the way to the ceiling, so from a high enough point in any of the cells, it is possible to see parts of most of the other cells on the same floor. The resulting model contains 538 million polygons. Of these, 59.7 million polygons lie in the viewing frustum. The Z-pyramid test is invoked on 1885 octree cubes and culls about 27 percent of the remaining model. The bounding boxes of 715 cubes are scan converted to cull about 72 percent of the model polygons in the viewing frustum leaving only 92.5K polygons (0.00017 of the total model) to be scan converted in software. On an SGI Crimson Elan, the entire process takes 8.9 seconds. Rendering this model using traditional Z-buffering on the Crimson Elan hardware takes approximately one hour and fifteen minutes. It is believed that rendering it in software on the Crimson would take significantly longer.

A second test of the algorithm is done with an outdoor scene consisting of simple plant models on a rolling terrain. The model used for the image consists of 53 million polygons, but only about 25 thousand of them are visible from this point of view. Most of the rest are hidden by a hill or are outside the viewing frustum. This frame takes 7 seconds to compute with the hierarchical visibility algorithm on an SGI Crimson. Rendering all primitives in the model with hardware acceleration would take a great deal longer.

A third test of the algorithm is done with a model consisting of 5 million polygons. Even though the model is simpler than the model of the second test, the image is more complicated and takes longer to render because a much larger fraction of the model is visible from this point of view. This image takes 40 seconds to render on an SGI Crimson with the hierarchical visibility algorithm. The hierarchical visibility algorithm is therefore believed to work effectively.

PARALLELIZABILITY AND IMAGE-SPACE COHERENCE

The hierarchical visibility algorithm is capable of dividing the image into a set of smaller windows, rendering the portions of the scene in individual windows simultaneously with multiple processors, and then compositing the windows into a final image. Such a parallelized implementation can accelerate processing considerably. Since the algorithm does take advantage of image-space coherence, parallel efficiency falls off somewhat as the windows are made smaller.

TAKING ADVANTAGE OF HARDWARE ASSISTANCE

The algorithm can be implemented in a manner to make the best possible use of available commercial hardware graphics accelerators. This raises some difficult challenges because the hierarchical visibility algorithm makes slightly different demands of scan-conversion hardware than traditional Z-buffering. In particular, the use of octree object-space coherence depends on being able to determine quickly whether any pixel of a polygon would be visible if it were scan converted, without actually rendering the polygon into the display buffer. Unfortunately, many commercial hardware graphics pipelines are either unable to answer this query at all, or are extremely slow at answering it because they are forced to flush a long pipeline for each query. One would certainly expect some delay in getting information back from a graphics pipeline, but hardware designed with this type of query in mind should be able to return a result in microseconds rather than milliseconds.

For example, visibility testing of cubes in the object-space octree can be performed on a Kubota Pacific Titan 3000 workstation with Denali GB graphics hardware. The Titan supports a graphics library call to determine whether or not any pixels in a polygon would be visible given the current Z-buffer although it unfortunately takes up to 10 milliseconds to execute. We use this feature to determine the visibility of octree cubes. The Titan implementation makes no use of the Z-pyramid because the cost of getting the required data to and from the hardware Z-buffer would exceed any possible savings.

Another implementation that makes use of graphics hardware runs on Silicon Graphics (SGI) workstations. On these workstations, there is no way to inquire whether or not a polygon is visible without rendering it, so we use a hybrid hardware/software strategy. We do the first frame of a sequence entirely with software. On the second frame, we render all the primitives inside cubes on the temporal coherence list with the hardware pipeline. Then we read the image and the Z-buffer from the hardware, form a Z-pyramid in memory and continue on in software, filling in newly visible geometry to complete the frame.

Optimally, the algorithm would be implemented using a graphics accelerator which reports visibility of primitives with minimal delay. The octree subdivision, the Z-pyramid and the temporal coherence strategy are all suitable for hardware implementation.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX

DECIDING WHETHER A RECTANGULAR SOLID INTERSECTS A CONVEX POLYHEDRON

1. Introduction

Various computer graphics techniques associate bounding boxes in the shape of rectangular solids with clusters of geometric primitives to enhance efficiency, the idea being that performing a single operation on a bounding box often eliminates the need to individually process primitives inside the box. When culling a geometric model to a viewing frustum, for example, if a bounding box lies outside the frustum, the primitives it contains also lie outside and need not be considered individually.

This observation underlies simple, fast procedures for culling models represented in spatial hierarchies. If geometric primitives are organized in an octree of bounding boxes, for example, boxes which lie entirely outside a viewing frustum can be efficiently culled by testing for box-frustum intersection during recursire subdivision of the octree: when considering an octree node, if its bounding box does not intersect the frustum, the geometry it contains is culled and the node is not subdivided. See B. Garlick, D. Baum and J. Winger, "Interactive viewing of large geometric databases using multiprocessor graphics workstations," Siggraph '90 Course Notes #28 (Parallel Algorithms and Architectures for 3D Image Generation), pp. 239–245, incorporated by reference herein. In this way, big chunks of a hierarchical model can be culled with individual intersection tests.

Hereafter we will refer to a convex polyhedron simply as a polyhedron and to an axis-aligned rectangular solid simply as a box. The problem of deciding whether a box intersects a polyhedron can be formulated in various ways, but it is usually attacked as a combination of a test for intersecting bounding boxes, tests to see if a vertex of one solid lies inside the other, and tests to see of an edge of one solid intersects a face of the other. Of these tests, edge-face intersections are the most time consuming.

Since box-polyhedron intersection tests may be performed hundreds or thousands of times in the course of producing a single image of a scene, devising an efficient intersection algorithm is worthwhile. Our approach is particularly efficient because it does not require finding geometric intersections such as edge-face intersections. Rather, after finding the equations of certain lines and planes associated with a polyhedron, box-polyhedron intersection can be determined by simply comparing bounding boxes and evaluating inequalities. The method is more efficient when boxes are nested because some information computed for a box can be reused by boxes that are inside of it. Thus the method is well suited to operating on octrees and other spatial hierarchies. The algorithm performs most efficiently when comparing numerous bounding boxes to the same polyhedron, but even when performing a single intersection test, efficiency compares favorably to other methods.

We precede our analysis of box-polyhedron intersection with a discussion of two primitive operations that our algorithm performs, determining whether a box intersects a plane and determining whether a rectangle intersects a polygon.

2. Box-Plane Intersection

We first consider the subproblem of determining whether a bounding box intersects a plane, using the method of Haines and Wallace, "Shaft Culling for Efficient Ray-Traced Radiosity," Siggraph '91 Course Notes #12 (Frontiers in Rendering), 2-1–2-28, incorporated by reference herein. Recall from analytic geometry that a plane equation has the form $Ax+By+Cz+D=0$ where vector $(A,B,C)$ is normal to the plane, and that a plane divides space into a negative half-space satisfying the inequality $Ax+By+Cz+D<0$ and a positive half-space satisfying the inequality $Ax+By+Cz+D>0$. To determine which side of a plane a point lies on we simply substitute its coordinates into the plane equation and check the sign of the expression, an operation that we refer to as evaluating a plane equation.

Figure 11:
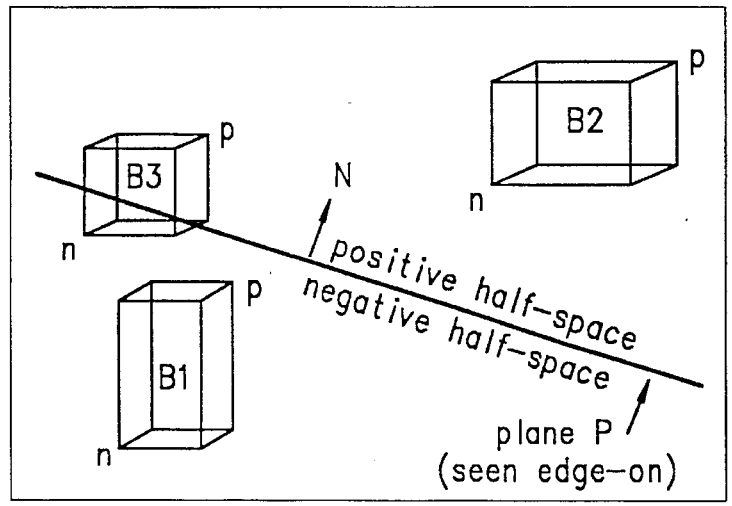
FIGS. 11, 13 and 21 illustrate scenes useful for an explanation of an intersection determination technique.

One of the fundamental operations performed by our box-polyhedron intersection algorithm is determining whether a box intersects a plane, and if not, which side of the plane the box lies on. The problem is illustrated in FIG. 11, an orthogonal projection in which the viewpoint has been chosen so that plane P is perpendicular to the screen. Vector N is normal to P, pointing into the positive half-space. Box B1 lies in P's negative half-space, box B2 lies in P's positive half-space, and box B3 intersects P. These are the three cases we wish to distinguish in general.

The first step in distinguishing these cases is to establish which of a box's vertices lies farthest in the "positive direction" (the direction of N), call this vertex the p-vertex, and which of the box's vertices lies farthest in the "negative direction," call this vertex the n-vertex. P- and n-vertices are easily identified, since the p-vertex corresponds to the octant of the plane's normal, and the n-vertex lies at the opposite corner. When an edge or face of the box is parallel to the plane the octant rule does not specify a unique vertex, but in these cases it doesn't matter which of the obvious candidates is selected. In FIG. 11, p-vertices are labelled p and n-vertices are labelled n. Note that the p- and n-vertices associated with a particular plane have the same relative positions on all axis-aligned bounding boxes, so they need to be identified only once.

Once p- and n-vertices have been identified, distinguishing the three cases of box-plane intersection is very simple. Box B lies entirely in plane P's negative half-space if and only if its p-vertex lies in P's negative half-space, B lies entirely in P's positive half-space if and only if its n-vertex lies in the positive half-space, and if neither of these relationships holds, B intersects P. See Haines-Wallace. It follows that we can determine whether a box lies in a particular half-space by evaluating one plane equation, and that the three cases of box-plane intersection can be distinguished by evaluating one or two plane equations as follows:

```
Given box B with n-vertex (xn,yn,zn) and p-vertex
(xp,yp,zp), and plane P with equation Ax+By+Cz+D=0
if( Axp+Byp+Czp+D<0 ) { B lies entirely in P's
negative half-space }
else if( Axn+Byn+Czn+D>0 ) { B lies entirely in P's
positive half-space }
else { B intersects P }
```

The two-dimensional problem of determining whether an axis-aligned rectangle a) intersects a line, b) lies entirely in the line's negative half-plane, or c) lies entirely in the line's positive half-plane is entirely analogous, requiring the evaluation of one or two line equations.

```
Given an axis-aligned rectangle R with n-vertex
(xn,yn) and p-vertex (xp,yp), and line L with
equation Ax+By+C=0:
if( Axp+Byp+C<0 ) { R lies entirely in L's negative
half-plane }
else if( Axn+Byn+C>0 ) { R lies entirely in L's
positive half-plane }
else{ R intersects L }
```

In both two and three dimensions, classification into the three intersection categories can be done more efficiently when boxes are nested, since the following "inheritance" rule can often be applied: if a box is entirely inside a "parent box" which has already been shown not to intersect the line or plane in question, then the box will have the same classification as its parent box, both lying entirely on the same side of the ine or plane.

Figure 13:
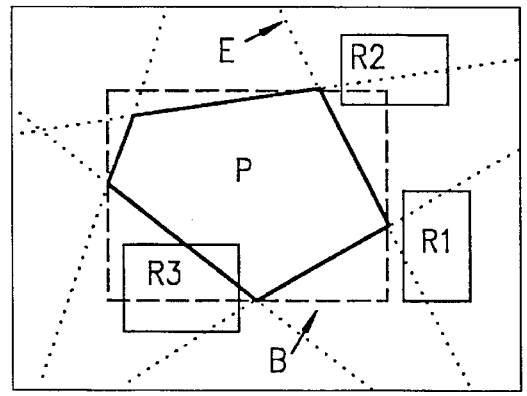

3. Rectangle-Polygon Intersection We now consider a second subproblem, determining whether an axis-aligned rectangle R and a convex polygon P, both lying in a plane, intersect. It can easily be shown that R intersects P if and only if (1) R intersects P's bounding box (assumed to be axis-aligned and "tight"), and (2) R does not lie entirely "outside" any of the infinite lines defined by P's edges, which we will refer to as edge-lines. (By outside we mean on the side opposite polygon G.) The problem is illustrated in FIG. 13 where P's bounding box B is drawn in dashed lines and P's edge-lines are drawn in dotted lines (e.g. E). Applying the intersection criteria to rectangles R1, R2, and R3 of FIG. 13, R1 is found not to intersect P because it does not intersect P's bounding box, failing criterion (1), R2 is found not to intersect P because it lies outside of edge-line E, failing criterion (2), and R3 is found to intersect P because it satisfies both criteria.

The rectangle-line intersection method described in the preceding section is an efficient way to evaluate criterion (2). With this method we can determine whether a rectangle lies outside an edge-line by substituting the coordinates of the rectangle's n-vertex into the edge-line's equation. For example, to show that R2 lies outside edge-line E we would substitute the coordinates of R2's lower left vertex (the n-vertex for E) into the line equation for E.

Figure 21:
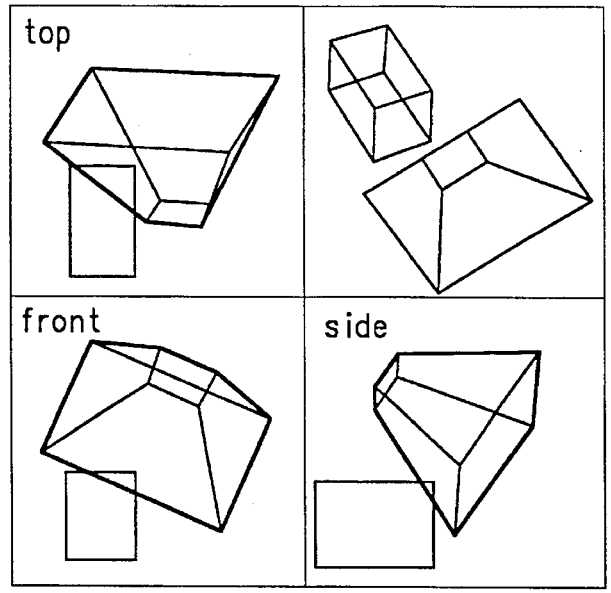

The rectangle-polygon intersection problem is germane because our algorithm looks for box-polyhedron intersection in axis-aligned orthographic views—the standard front, side, and top views of engineering drawings—and in such a view box (i.e., an axis-aligned rectangular solid) always projects to an axis-aligned rectangle and the silhouette of a convex polyhedron is always a convex polygon. For example, the panels labeled "front," "side," and "top" in FIG. 21 show axis-aligned orthographic views of a box and a polyhedron in the shape of a viewing frustum. Once the polygonal silhouette of the polyhedron has been identified in each axis-aligned orthographic view, determining whether box-polyhedron intersection occurs in that view reduces to the rectangle-polygon intersection problem described above. (Finding a convex polyhedron's silhouette edges is particularly straightforward in an axis-aligned orthographic view and in parallel projections in general. In a view down an axis, call it the u-axis, if the u components of outward-pointing normals of two adjacent faces have opposite signs, their common edge is a silhouette edge.)

If a box and a polyhedron do not intersect in any axis-aligned orthographic view, they do not intersect in 3D. It follows from the rules for rectangle-polygon intersection presented in the preceding section that a box B and a polyhedron P intersect in all three axis-aligned orthographic views if and only if 1) B intersects P's bounding box and 2) the projection of B does not lie outside any of the edge-lines of P's silhouette in any axis-aligned orthographic view. These are among the geometric conditions that our box-polyhedron intersection algorithm evaluates, as described in the following section.

4. Box-Polyhedron Intersection

The basic tools that we use to determine box-polyhedron intersection are now in place. Our intersection algorithm is based on the observation that bounding box B intersects convex polyhedron P if and only if (a) the projections of B and P intersect in all three axis-aligned orthographic views, and (b) B does not lie entirely "outside" any face-plane of P. (By outside we mean on the side opposite polyhedron P.) In reference to FIG. 21, the illustrated box and polyhedron satisfy condition (a) but not condition (b), as is evident in the view at upper right.

We now present the actual algorithm. Assuming for the moment that P will be compared to numerous bounding boxes, we begin with the following preliminary steps: (1) for each face of P we find the plane equation and identify which box corner is the n-vertex, (2) for each silhouette edge of P in an axis-aligned orthographic view we find the line equation and identify which box corner is the n-vertex (i.e. we pick either of the two vertices which coincide in the axis-aligned orthographic view), and (3) we find P's bounding box. If P will be compared to only a small number of boxes, lazy evaluation of this information may be more efficient. Now box-polyhedron intersection testing proceeds as follows. If B does not intersect P's bounding box, we conclude B does not intersect P and we are done. Next we consider P's face-planes one by one, seeing if B lies entirely outside any of these planes using the method of section 3. If so, B and P do not intersect and we are done. Finally, we consider P's edge-lines (i.e., the lines defined by P's silhouette edges in axis-aligned orthographic views) one-by-one, seeing if B's rectangular projection lies entirely outside any of these lines in an axis-aligned orthographic view, again using the method of section 3. If so, B and P do not intersect and we are done. Otherwise, all intersection criteria have been satisfied and we conclude that intersection does occur. Although the geometric conditions evaluated by this algorithm are formulated somewhat differently than intersection criteria (a) and (b) above, it should be clear from the discussion in section 4 that they are equivalent.

To estimate the computational expense of the algorithm we examine the cost of the primitive operations. We can determine whether two 3D bounding boxes intersect by evaluating between one and six simple inequalities of the form "is a<b?" Determining whether B lies entirely outside a face-plane requires evaluating one plane equation. Determining whether B's projection lies entirely outside an edge-line requires evaluating one line equation. So when comparing a box to a polyhedron with F faces and E silhouette edges in axis-aligned orthographic views, each box-polyhedron intersection test requires (1) evaluating between one and six simple inequalities to see if bounding boxes intersect, (2) evaluating between zero and F plane equations, and (3) evaluating between zero and E line equations. Summing up, between one and 6+E+F inequalities must be evaluated to show that B and P do not intersect, and all 6+E+F inequalities must be evaluated to show that B and P do intersect. For a viewing frustum, E is at most 18 and F is 6, so the maximum number of inequalities which must be evaluated is 30. We should also amortize the cost of finding line and plane equations and identifying n-vertices over the number of intersection tests performed.

There are many variations on this basic algorithm. To avoid evaluating all 6+E+F inequalities whenever intersection occurs, a test can be added to see if the polyhedron lies entirely inside the box or vice versa. When culling geometry to a viewing frustum it may be useful to know which of the frustum's faces a box intersects, because they correspond to clipping planes. The algorithm outlined in pseudo-code in the following section includes these refinements.

5. Pseudo- Code Given an axis - aligned bounding box B (a rectangular solid) and a convex polyhedron P, the following procedure classifies B as entirely inside P, partially inside P, or entirely outside P, and when B is partially inside P, reports which face-planes of P are intersected by B. The algorithm can be streamlined for applications which only need to know whether or not intersection occurs.

Preprocessing Step

Determine P's bounding box.
Find the plane equation of each face of P (these are "face-planes").
Determine which box vertex is the "n-vertex" and which is the "p-vertex" for each face-plane of P.
Find the line equation of each silhouette edge of P in an axis-aligned orthographic view (these are "edge-lines").
Determine which box vertex is the "n-vertex" for each edge-line of P (pick either of two equivalent vertices).

Bounding Box Tests if B does not intersect P's bounding box, B is entirely outside P, done
if P's bounding box is entirely inside B, B is partially inside P and B intersects all face-planes, done Face-plane Tests for each face-plane F {
    /* We could exploit nesting here with this inheritance
    rule: If B is entirely inside a "parent box" which is
    entirely inside F, then B is entirely inside F */
    if B is entirely outside F, B is entirely outside P, done
    if B is entirely inside F, set flag for this face-plane
    to "no intersection"
    else B intersects F, set flag for this face-plane to
    "intersection"
}
if B is entirely inside all six face-planes, B is entirely inside P, done Edge-line Tests for each edge-plane E
    if B is entirely outside E, B is entirely outside P, done
B is partially inside P, done

We claim:
1. Apparatus for use in rendering a 3D scene onto a display, said display having a display area divided into a plurality of display cells, said 3D scene comprising at least one surface divided into a plurality of surface cells, each of said surface cells corresponding to a respective one of said display cells, said apparatus comprising a depth buffer having a plurality of granularity levels proceeding from a finest level to a coarsest level,
    each of said granularity levels containing at least one Z-max element,
    each of the Z-max elements in said finest granularity level covering a respective one of said display cells,
    each of the Z-max elements in a granularity level coarser than said finest granularity level corresponding to and covering all of the display cells covered by a respective group of the Z-max elements in the next finer granularity level,
    each of said Z-max elements which covers a display cell into which a surface cell has been rendered, containing a depth value indicating the depth in said 3D scene of the farthest surface cell which is rendered into the group of display cells covered by said Z-max element.
2. Apparatus according to claim 1, further comprising a Z-min element corresponding to each of said Z-max elements which is in a granularity level coarser than said finest granularity level,
    each of said Z-min elements whose corresponding Z-max element covers a display cell into which a surface cell has been rendered, containing a depth value indicating the depth in said 3D scene of the nearest surface cell which is rendered into the group of display cells covered by the Z-max element corresponding to said Z-min element.

3. Apparatus according to claim 1, wherein said coarsest level contains exactly one Z-max element.

4. Apparatus according to claim 1, wherein each of said groups of Z-max elements in a given granularity level is defined to cover exactly a 2×2 rectangle of the display cells covered by the individual Z-max elements in said given granularity level.

5. Apparatus according to claim 1, further comprising a display buffer having a data element corresponding to each of said display cells, each of said data elements which corresponds to a display cell into which a surface cell has been rendered, containing a color value for said surface cell.

6. A method for updating a depth buffer for a display having a display area divided into a plurality of display cells, for use with a plurality of new depth values for corresponding predetermined ones of said display cells, for use further with a depth buffer having a plurality of granularity levels proceeding from a finest level to a coarsest level, each of said granularity levels containing at least one Z-max element, each of the Z-max elements in said finest granularity level covering a respective one of said display cells, each of the Z-max elements in a granularity level coarser than said finest granularity level corresponding to and covering all of the display cells covered by a respective group of the Z-max elements in the next finer granularity level, comprising the steps of:

writing each of said new depth values into said finest granularity level at the Z-max element which covers the display cell to which the new depth value corresponds; and updating each of the Z-max elements in the granularity levels coarser than said finest granularity level, which Z-max elements cover the display element to which one of said new depth values correspond, to contain the farthest depth value of all the display cells covered by such Z-max element.

7. A method according to claim 6, wherein said step of updating comprises the step of iteratively, for progressively coarser current granularity levels beginning with the granularity level which is immediately coarser than said finest granularity level, for each given Z-max element in the current granularity level which covers the display element to which one of said new depth values corresponds, writing into said given Z-max element, if the farthest depth value in all of the Z-max elements which correspond to the given Z-max element in the next-finer granularity level to the current granularity level is nearer than the depth value than in said given Z-max element, said farthest depth value.

8. A method according to claim 6, wherein said depth buffer further has a Z-min element corresponding to each of said Z-max elements which is in a granularity level coarser than said finest granularity level, further comprising the step of updating each of the Z-min elements in the granularity levels coarser than said finest granularity level, the Z-max elements corresponding to which Z-min elements cover the display element to which one of said new depth values correspond, to contain the nearest depth value of all the display cells covered by the Z-max element corresponding to such Z-min element.

9. A method for updating a depth buffer for a display having a display area divided into a plurality of display cells, for use with a plurality of new depth values for corresponding predetermined ones of said display cells, for use further with a depth buffer having a plurality of granularity levels proceeding from a finest level to a coarsest level, each of said granularity levels containing at least one Z-max element, each of the Z-max elements in said finest granularity level covering a respective one of said display cells, each of the Z-max elements in a granularity level coarser than said finest granularity level corresponding to and covering all of the display cells covered by a respective group of the Z-max elements in the next finer granularity level, comprising the steps of:

writing each of said new depth values into said finest granularity level at the Z-max element which covers the display cell to which the new depth value corresponds; and iteratively, for a particular one of said new depth values and for progressively coarser current granularity levels beginning with the granularity level which is immediately coarser than said finest granularity level, at least while said particular new depth value is nearer than the depth value then in the Z-max element of the current granularity level which covers the display cell corresponding to said particular new depth value, writing said particular new depth value into said Z-max element of the current granularity level which covers the display cell corresponding to said particular new depth value.

10. A method according to claim 9, wherein said iteration terminates when said particular new depth value is not nearer than the depth value then in the Z-max element of the current granularity level which covers the display cell corresponding to said particular new depth value.

11. A method according to claim 9, wherein said depth buffer further has a Z-min element corresponding to each of said Z-max elements which is in a granularity level coarser than said finest granularity level, further comprising the step of updating each of the Z-min elements in the granularity levels coarser than said finest granularity level, the Z-max elements corresponding to which Z-min elements cover the display element to which one of said new depth values correspond, to contain the nearest depth value of all the display cells covered by the Z-max element corresponding to such Z-min element.

12. A method for attempting to prove that a subject surface is hidden relative to surfaces previously rendered, for use in ultimately displaying a 3D scene on a display having a display area divided into a plurality of display cells, said scene having a plurality of said surfaces, said subject surface being divided into a plurality of subject surface cells corresponding to respective destination ones of said display cells, each of said subject surface cells having a depth, for use further with a depth buffer having a plurality of granularity levels proceeding from a finest level to a coarsest level, each of said granularity levels containing at least one Z-max element, each of the Z-max elements in said finest granularity level covering a respective one of said display cells, each of the Z-max elements in a granularity level coarser than said finest granularity level corresponding to and covering all of the display cells covered by a respective group of the Z-max elements in the next finer granularity level, said method comprising the steps of:

finding a covering one of said Z-max elements which covers all of said destination display cells; and determining whether the depth value in said covering Z-max element is nearer than the nearest of said subject surface cells and terminating said method affirmatively if so.

13. A method according to claim 12, wherein said depth buffer further has a Z-min element corresponding to each of said Z-max elements which is in a granularity level coarser than said finest granularity level, further comprising the step of determining whether the depth value in the Z-min element corresponding to said covering Z-max element is farther than the nearest of said subject surface cells and terminating said method non-affirmatively if so.

14. A method according to claim 12, further comprising the step of, after said step of determining, further determining whether the granularity level of said covering Z-max element is finer than a predetermined granularity and terminating said method non-affirmatively if so.

15. A method according to claim 12, further comprising the steps of:

finding a first one of the Z-max elements which, in the granularity level immediately finer than the level of said covering Z-max element, corresponds to said covering Z-max element and covers a first non-null portion of said subject surface; and attempting to prove that said first portion of said subject surface is hidden relative to surfaces previously rendered and terminating said method non-affirmatively if such attempt fails.

16. A method according to claim 15, further comprising the steps of:

repeating said steps of finding and attempting to prove, for different ones of said Z-max elements which, in the granularity level immediately finer than the level of said covering Z-max element, corresponds to said covering Z-max element and covers a non-null portion of said subject surface, said repetition continuing until said method terminates in non-affirmatively response to a repetition of said step of attempting to prove; and after said step of repeating, terminating said method affirmatively.

17. A method according to claim 15, wherein said step of attempting to prove comprises the step of determining whether the depth value in said first Z-max element is nearer than the nearest surface cell of said first portion of said subject surface and, and if so, then terminating affirmatively said step of attempting to prove.

18. A method according to claim 12, further comprising, after said step of determining, the steps of:

iterating through finer-level Z-max elements which, in the granularity level immediately finer than the level of a current granularity level, corresponds to a superior Z-max element in said current level and covers a non-null portion of said subject surface; and in each such iteration, making an attempt to prove that the portion of said subject surface covered by the finer-level Z-max element is hidden relative to surfaces previously rendered and terminating said method non-affirmatively if such attempt fails, each given iteration of said step of making an attempt to prove, comprising the steps of:

determining whether the depth value in the finer-level Z-max element is nearer than said nearest of said subject surface cells;

if so then terminating affirmatively the given iteration of said step of making an attempt to prove;

and if not then recursively performing the steps of iterating and in each iteration making said attempt to prove, for progressively finer current granularity levels to and including a predetermined minimum granularity level, said current granularity level beginning with the granularity level of said covering Z-max element, and said method terminating non-affirmatively in response to a negative determination in any repetition of said step of determining whether the depth value in the finer-level Z-max element is near than said nearest of said subject surface cells, for a current granularity level which is said predetermined minimum granularity level.

19. A method according to claim 12, further comprising, after said step of determining, the steps of:

iterating through finer-level Z-max elements which, in the granularity level immediately finer than the level of a current granularity level, corresponds to a superior Z-max element in said current level and covers a non-null portion of said subject surface; and in each such iteration, making an attempt to prove that the portion of said subject surface covered by the finer-level Z-max element is hidden relative to surfaces previously rendered and terminating said method non-affirmatively if such attempt fails, each given iteration of said step of making an attempt to prove, comprising the steps of:

determining whether the depth value in the finer-level Z-max element is nearer than the nearest surface cell in the portion of said subject surface covered by the finer-level Z-max element;

if so then terminating affirmatively the given iteration of said step of making an attempt to prove;

and if not then recursively performing the steps of iterating and in each iteration making said attempt to prove for progressively finer current granularity levels to and including a predetermined minimum granularity level, said current granularity level beginning with the granularity level of said covering Z-max element, and said method terminating non-affirmatively in response to a negative determination in any repetition of said step of determining whether the depth value in the finer-level Z-max element is near than the nearest surface cell in the portion of said subject surface covered by the finer-level Z-max element, for a current granularity level which is said predetermined minimum granularity level.

20. A method according to claim 18, wherein said depth buffer further has a Z-min element corresponding to each of said Z-max elements which is in a granularity level coarser than said finest granularity level, further comprising the step of determining whether the depth value in the Z-min element corresponding to said covering Z-max element is farther than the nearest of said subject surface cells and terminating said method non-affirmatively if so, and wherein each of said iterations of said step of making an attempt to prove further comprises, prior to the step of recursively performing, the step of determining whether the depth value in the Z-min element corresponding to the finer-level Z-max element is farther than the nearest of said subject surface cells and terminating said method non-affirmatively if so.

21. A method for rendering sequential frames on a display, each of said frames being a respective view of a plurality of objects, each of said views comprising at least one camera parameter, comprising the steps of:

determining, with a visibility algorithm, a first subset of said objects to render in a first frame;

maintaining an indication of which of said objects are in said first subset;

rendering said first subset of objects on said display in said first frame;

re-rendering said first subset of objects on said display in a second frame from said maintained indications;

determining, with a visibility algorithm, a second subset of said objects to render in said second frame in addition to the objects in said first subset; and rendering said second subset of objects on said display in said second frame.

22. A method according to claim 21, wherein the view of said plurality of objects in said first frame is different from the view of said plurality of objects in said second frame.

23. A method according to claim 21, wherein said step of maintaining an indication of which of said objects are in said first subset, comprises the step of preparing a list of the objects in said first subset, and wherein said step of re-rendering said first subset of objects on said display in a second frame from said maintained indication, comprises the step of re-rendering on said display in said second frame, all of the objects on said list.

24. A method according to claim 23, further comprising the steps of:

adding said second subset of objects to said list;

re-rendering on said display in a third frame, all of the objects on said list;

determining, with a visibility algorithm, a third subset of said objects to render in said frame in addition to those objects on said list; and rendering said third subset of objects on said display in said third frame.

25. A method according to claim 24, further comprising the steps of:

determining, with a visibility algorithm, the objects in said first subset which are hidden in the view of said second frame by objects in said second subset; and deleting said hidden objects from said list.

26. A method according to claim 21, for use with a model space containing said plurality of objects, said model space being represented with an octree having a plurality of nodes including a root node, each of said nodes corresponding to a predetermined sub-space of said model space, each of said nodes except said root node having a parent node, the sub-space corresponding to each of said nodes except said root node being wholly within the sub-space corresponding to the node's parent node, for use further with a plurality of primitives, each associated with at least one of said nodes, wherein each of said objects comprises the sub-space corresponding to a respective one of said nodes, and wherein said step of rendering said first subset of objects comprises the step of rendering all of the primitives in said plurality of primitives which are visible in the view of said first frame, and which are associated with the node of an object in said first subset.

27. A method according to claim 26, wherein each of said sub-spaces is bounded by faces, and wherein each of said steps of determining objects to render comprises the step of making an attempt to prove that all of the faces of the sub-space of one of said plurality of objects are hidden in the view of a frame.

28. A method according to claim 21, for use with a model space containing said plurality of objects, each of said objects comprising a sub-space of said model space, each of said sub-spaces being bounded by faces, wherein said step of determining a first subset of said objects to render comprises the step of making an attempt to prove that all of the faces of one of said sub-spaces are hidden in the view of said first frame.

29. Apparatus for use in rendering a view of a model space onto a display, comprising a computer-readable storage medium having stored thereon:

information in a data structure having a plurality of nodes organized in a hierarchical tree, said nodes including a root node, each of said nodes corresponding to a predetermined sub-space of said model space, each of said nodes except said root node having a parent node, the sub-space corresponding to each of said nodes except said root node being wholly within the sub-space associated with the node's parent node, said information representing a plurality of surface primitives, each associated with at least one of said nodes and each at least partly contained within the sub-space corresponding to each of the nodes with which the surface primitive is associated.

30. Apparatus according to claim 29, wherein said hierarchical tree is an octree, wherein all of said sub-spaces are cubic, and wherein the sub-space corresponding to each of said nodes except said root node occupies exactly one octant of the sub-space corresponding to the node's parent node.

31. A method for rendering a 3D scene onto a display, said 3D scene comprising a view of a model space which includes a plurality of surface primitives, comprising the steps of:

preparing an object-space octree having a plurality of nodes including a root node, each of said nodes except said root node having a parent node, each of said nodes corresponding to a respective sub-space of said model space, the sub-space of each of said nodes except said root node occupying an octant of the sub-space of the node's parent node, at least each of said primitives which is larger than a particular size being associated with a node whose corresponding model space completely contains the primitive; and for current nodes of said octree beginning with said root node, performing the recursire steps of: (a) making a determination whether the sub-space corresponding to the current node is definitively hidden relative to primitives previously rendered in said scene, (b) only if not, then rendering at least visible parts of the primitives associated with said current node, and (c) also only if not, recursively performing said recursive steps for each child node of said current node in front-to-back order of the sub-spaces corresponding to said child nodes.

32. A method according to claim 31, wherein each of said primitives in said plurality of surface primitives is associated with a node whose corresponding sub-space completely contains the primitive.

33. A method according to claim 31, wherein all of said primitives which are smaller than said particular size and which intersect two of said sub-spaces which are both larger than a second particular size, are associated with both of the nodes corresponding to said two sub-spaces.

34. A method according to claim 31, wherein for each of said primitives which is associated with a node whose corresponding sub-space contains the primitive, the associated node is the node whose corresponding sub-space is the smallest of said sub-spaces which contains the primitive.

35. A method according to claim 31, wherein each of said sub-spaces is bounded by faces, at least one of which faces of each sub-space is forward-facing, wherein said step of making a determination whether the sub-space corresponding to the current node is definitively hidden relative to primitives previously rendered, comprises the steps of:

determining whether all of the forward-facing faces of the sub-space corresponding to the current node are definitively hidden relative to primitives previously rendered;

and if not then terminating non-affirmatively said step of making a determination;

and if so then terminating affirmatively said step of making a determination.

36. A method according to claim 35, wherein said display is divided into a plurality of display cells, and wherein each of said forward-facing faces is divided into a plurality of face cells each corresponding to one of said display cells and each having a depth, for use with a depth buffer having a plurality of granularity levels proceeding from a finest level to a coarsest level, each of said granularity levels containing at least one Z-max element, each of the Z-max elements in said finest granularity level covering a respective one of said display cells, each of the Z-max elements in a granularity level coarser than said finest granularity level corresponding to and covering all of the display cells covered by a respective group of the Z-max elements in the next finer granularity level, each of said Z-max elements which covers a display cell into which a surface cell has been rendered, containing a depth value indicating the depth in said 3D scene of the farthest surface cell which is rendered into the group of display cells covered by said Z-max element, wherein said step of determining whether all of the forward-facing faces are definitively hidden comprises the steps of:

iteratively, through said forward-facing faces, deciding whether the face is definitively hidden relative to primitives previously rendered;

terminating non-affirmatively said step of determining if said step of determining if said step of deciding terminates non-affirmatively for any of said forward-facing faces; and terminating affirmatively said step of determining otherwise, wherein said step of deciding whether the face is definitively hidden comprises the steps of:

finding a covering one of said Z-max elements which covers all of the face cells of the face; and detecting whether the depth value in said covering Z-max element is nearer than the nearest of the face cells of said first one of said forward-facing faces and terminating affirmatively said step of deciding, if so.

37. A method according to claim 31, wherein said display is divided into a plurality of display cells, and wherein each of said surface primitives associated with said current node is divided into a plurality of surface cells each corresponding to one of said display cells and each having a depth, for use with a depth buffer having a plurality of granularity levels proceeding from a finest level to a coarsest level, each of said granularity levels containing at least one Z-max element, each of the Z-max elements in said finest granularity level covering a respective one of said display cells, each of the Z-max elements in a granularity level coarser than said finest granularity level corresponding to and covering all of the display cells covered by a respective group of the Z-max elements in the next finer granularity level, said groups being defined such that the display cells covered by each of said groups are contiguous, wherein the step of rendering at least visible parts of the primitives associated with said current node comprises the steps of, for at least one given primitive associated with said current node;

for each of the surface cells in said given primitive, writing the depth value of said surface cell into said finest granularity level at the Z-max element which covers the display cell to which said surface cell corresponds, if the depth value of said surface cell is nearer than the depth value than in the Z-max element which covers the display cell to which said surface cell corresponds; and updating each of the Z-max elements in the granularity levels coarser than said finest granularity level, which Z-max elements cover the display element to which one of said new depth values correspond, to contain the farthest depth value of all the display cells covered by such Z-max element.

* * * * *